AUTOMATIC STRAPPING MACHINE

Original Filed Oct. 2, 1961 17 Sheets-Sheet 1

INVENTOR
HAROLD K. EMBREE
BY- Smart & Biggar
ATTORNEYS.

AUTOMATIC STRAPPING MACHINE

Original Filed Oct. 2, 1961 17 Sheets-Sheet 2

INVENTOR
HAROLD K. EMBREE
BY- Smart + Biggar.
ATTORNEYS

AUTOMATIC STRAPPING MACHINE

Original Filed Oct. 2, 1961 17 Sheets-Sheet 3

INVENTOR
HAROLD K. EMBREE
BY- Smart & Biggar.
ATTORNEYS

AUTOMATIC STRAPPING MACHINE

Original Filed Oct. 2, 1961 17 Sheets-Sheet 4

INVENTOR
HAROLD K. EMBREE
BY— Smart & Biggar
ATTORNEYS

AUTOMATIC STRAPPING MACHINE

Original Filed Oct. 2, 1961 17 Sheets-Sheet 5

INVENTOR
HAROLD K. EMBREE

BY— Smart & Biggar
ATTORNEYS

AUTOMATIC STRAPPING MACHINE

Original Filed Oct. 2, 1961 17 Sheets-Sheet 6

INVENTOR
HAROLD K. EMBREE
BY- Smart & Biggar
ATTORNEYS

AUTOMATIC STRAPPING MACHINE

Original Filed Oct. 2, 1961 17 Sheets-Sheet 7

INVENTOR
HAROLD K. EMBREE
BY- Smart & Biggar
ATTORNEYS

Nov. 21, 1967 H. K. EMBREE Re. 26,307

AUTOMATIC STRAPPING MACHINE

Original Filed Oct. 2, 1961 17 Sheets-Sheet 8

INVENTOR
HAROLD K. EMBREE
BY- Smart & Biggar
ATTORNEYS.

AUTOMATIC STRAPPING MACHINE
Original Filed Oct. 2, 1961 17 Sheets-Sheet 9
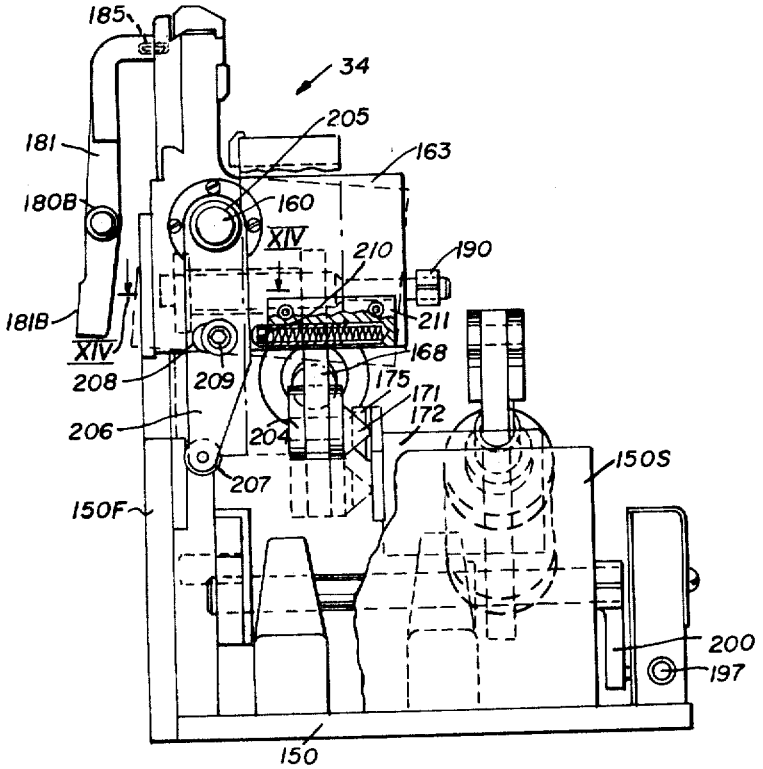
FIG. 13
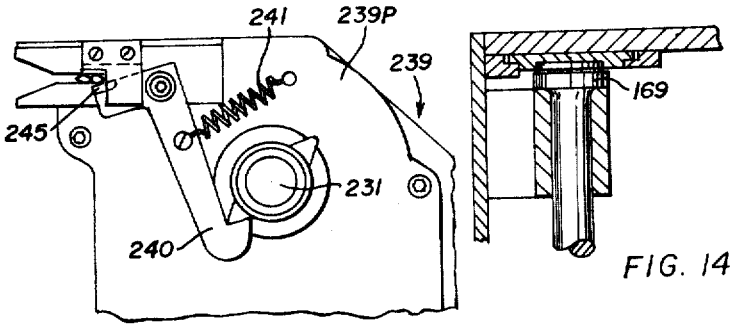
FIG. 14
FIG. 29
INVENTOR
HAROLD K. EMBREE
BY- Smart & Biggar
ATTORNEYS

AUTOMATIC STRAPPING MACHINE

Original Filed Oct. 2, 1961 17 Sheets-Sheet 10

INVENTOR
HAROLD K. EMBREE
BY- Smart & Biggar
ATTORNEYS

INVENTOR
HAROLD K. EMBREE
BY- Smart & Biggar
ATTORNEYS

INVENTOR
HAROLD K. EMBREE
BY- Smart & Biggar
ATTORNEYS.

INVENTOR
HAROLD K. EMBREE
BY- Smart + Biggar
ATTORNEYS

AUTOMATIC STRAPPING MACHINE

Original Filed Oct. 2, 1961 17 Sheets-Sheet 14

INVENTOR
HAROLD K. EMBREE
BY- Smart + Biggar
ATTORNEYS

Nov. 21, 1967 H. K. EMBREE Re. 26,307

AUTOMATIC STRAPPING MACHINE

Original Filed Oct. 2, 1961 17 Sheets-Sheet 15

INVENTOR
HAROLD K. EMBREE
BY- Smart + Biggar
ATTORNEYS.

INVENTOR
HAROLD K. EMBREE
BY- Smart & Biggar.
ATTORNEY.

Nov. 21, 1967 H. K. EMBREE Re. 26,307

AUTOMATIC STRAPPING MACHINE

Original Filed Oct. 2, 1961 17 Sheets-Sheet 17

INVENTOR
HAROLD K. EMBREE
BY— Smart & Biggar.
ATTORNEYS

United States Patent Office

Re. 26,307
Reissued Nov. 21, 1967

26,307

AUTOMATIC STRAPPING MACHINE

Harold K. Embree, Hamilton, Ontario, Canada, assignor to Ovalstrapping Limited, Hamilton, Ontario, Canada Original No. 3,196,779, dated July 27, 1965, Ser. No. 142,040, Oct. 2, 1961. Application for reissue June 2, 1966, Ser. No. 582,172
17 Claims. (Cl. 100—4)

Matter enclosed in heavy brackets [ ] appears in the original patent but forms no part of this reissue specification; matter printed in italics indicates the additions made by reissue

*ABSTRACT OF THE DISCLOSURE*

*An automatic strap applying machine feeds wire strapping through a loop forming frame, draws the thus-formed loop tightly about a package, knots the tightly-drawn loop and severs it from the wire strapping supply. The loop forming frame is specially constructed to facilitate wire feeding therethrough.*

The present invention relates to automatic strapping machines of the type used for example for applying wire straps to bales of paper pulp.

The invention particularly relates to a fully automatic strapping machine which, when initiated, applies a strap in form of a loop to a package, tensions the strap about the package and knots the strap, all without the necessity of intervention by the operator.

In the past, wire tying machines have fallen into three general categories, firstly, the type where the strap is applied largely by the operator who manually operates hand tools to tension and knot the strap about the bale, secondly the type in which a loop is formed by a machine applied to the package and then tensioned and tied by the operator, and, thirdly the type in which a loop is formed by a machine and applied under tensions.

The devices of the prior art have suffered from several disadvantages not the least of which was a great waste of strapping material after the formtaion and severing of the strap. A disadvantage of the first two mentioned machines was that, owing to the bulk and clumsiness of the machines and the amount of manual exertion required by the operator in order to form the strap, operators were considerably fatigued after a working shift and production was relatively low for the length of man-hours involved in the operation, whilst a disadvantage of the further type of machine was that, owing to the strap being applied under tension the strapping curled. Thus when the strap was cut from the bale, it was often hazardous to the cutter because of the inherent uneven curl in the strap.

The present invention has to a very large extent overcome operator fatigue by providing a machine which is automatic and requires no effort on the part of the operator other than the pushing of a button to start the machine in order to cause the formation of straps about packages or bales.

Applicant has further overcome the disadvantages of the prior art by providing a machine in which substantially all of the strap applied about the package is used for the purpose of strap formation, thus eliminating waste of strapping material.

Still furthermore according to this invention, the strap is applied in an unstrained condition.

According to the present invention, an automatic strap applying machine for use with a reel of wire or the like comprises strap feeding means, loop forming means adapted to receive the wire from the feeding means and form a loop about the package when in place in the machine, strap tensioning means for tensioning the formed loop about said package and twisting means operable to form a knotting twist to overlapping ends of the loop, and cutter means operable to sever the knotted loop from the reel, all of which means are capable of being operated automatically and in a predetermined sequence.

A further feature of the present invention is to provide a conveyor means associated in a timed relationship with the strap applying machine in such a manner that a plurality of straps may be applied to a package in a predetermined sequence.

The following is a description by way of example with reference to the accompanying drawings in which:

FIGURE 13 is an end view of the same gripper device;

FIGURE 14 is a detail in lines XIV—XIV of FIGURE 13;

Figure 1:
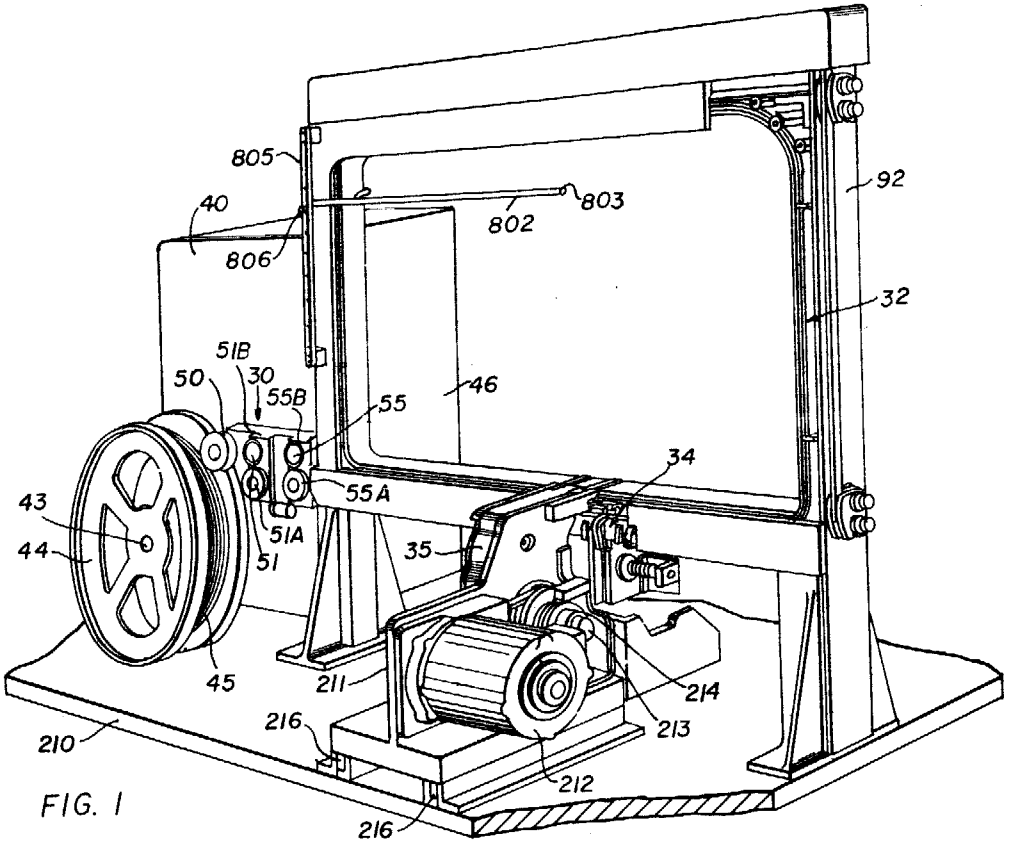
FIGURE 1 is a pictorial view of the strap applying device, certain parts having been removed for the purpose of illustration.
Figure 7:
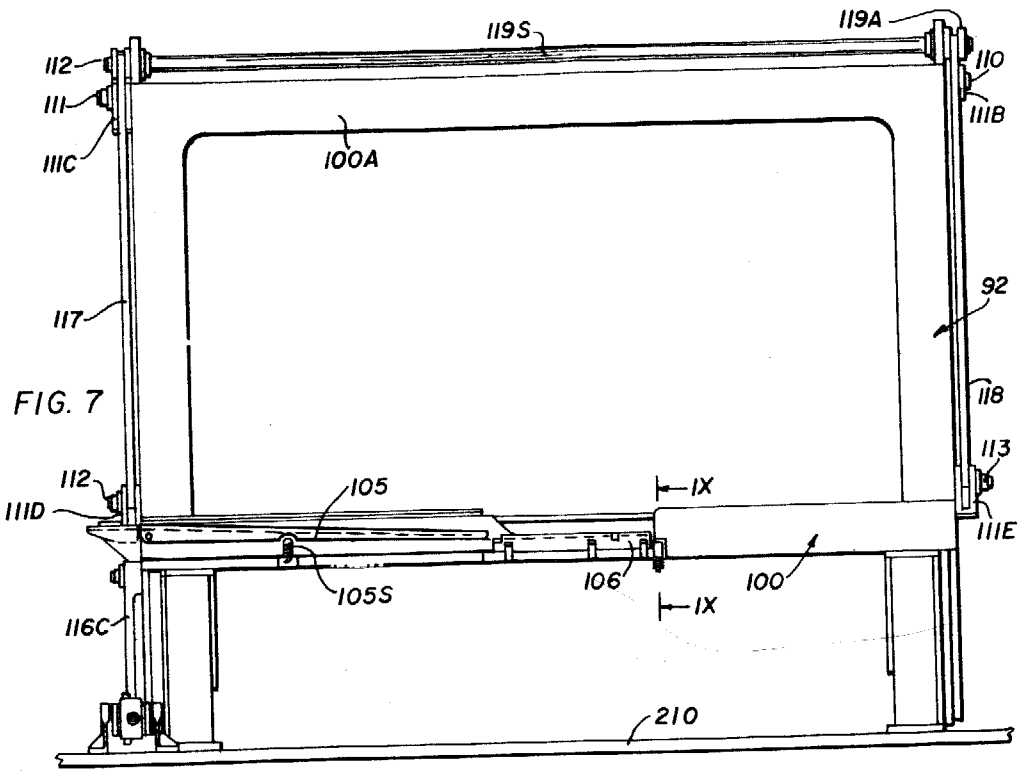
FIGURE 7 and FIGURE 8 are front and side views, respectively of the main frame and the linkage for moving the support frame and loop-forming guideway therewithin, part of the front panel of the main frame having been removed to illustrate parts of the guideway.
Figure 8:
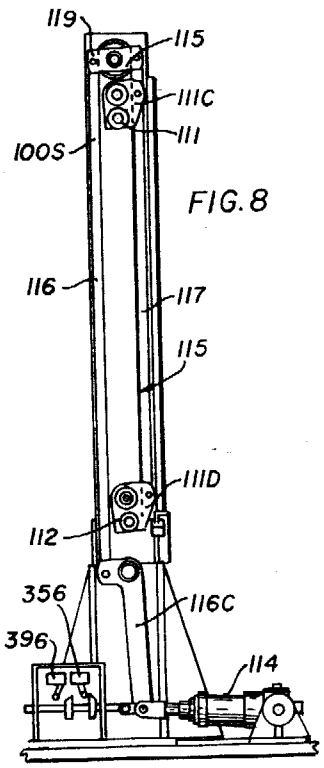
Figure 16:
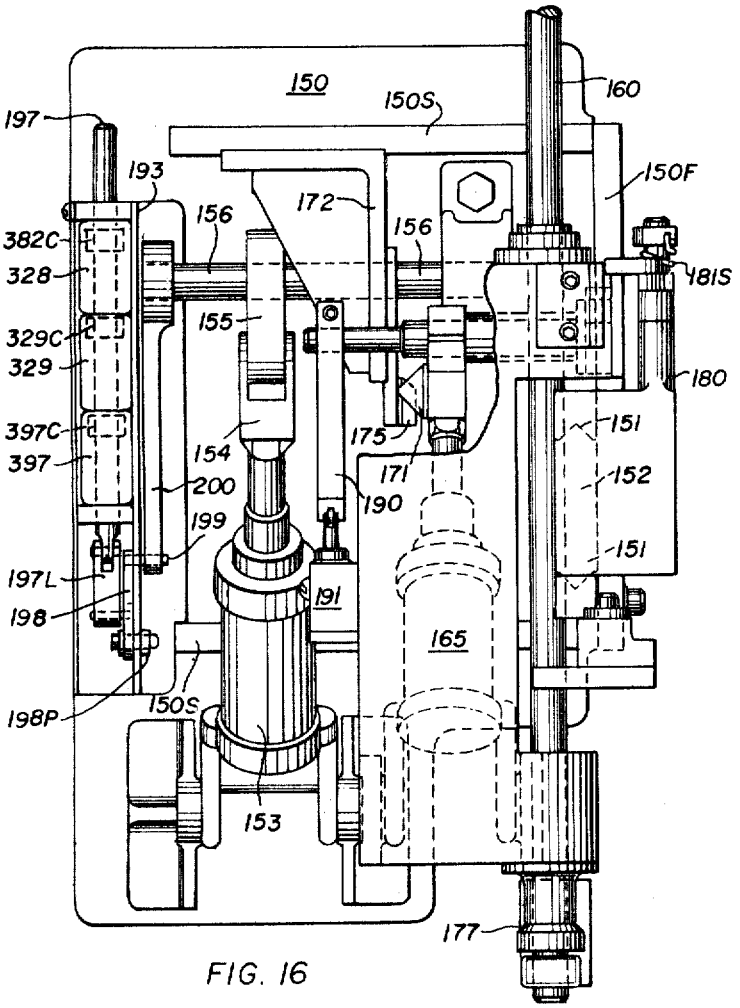
FIGURE 16 is a plan view of the gripper.
Figure 28:
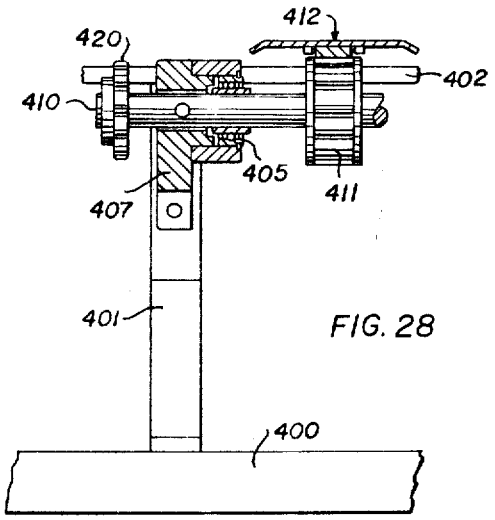
Figure 19:
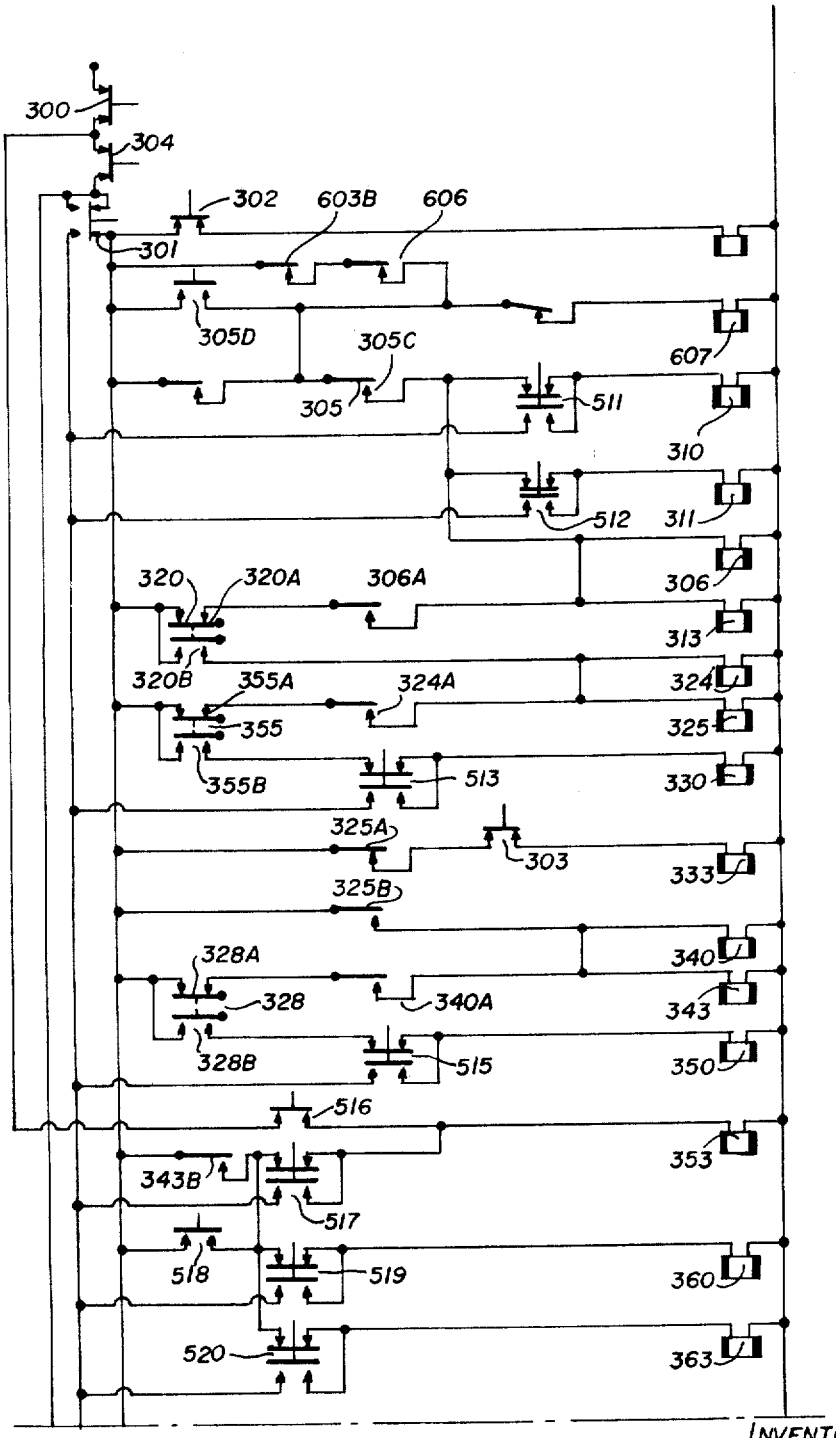
Figure 20:
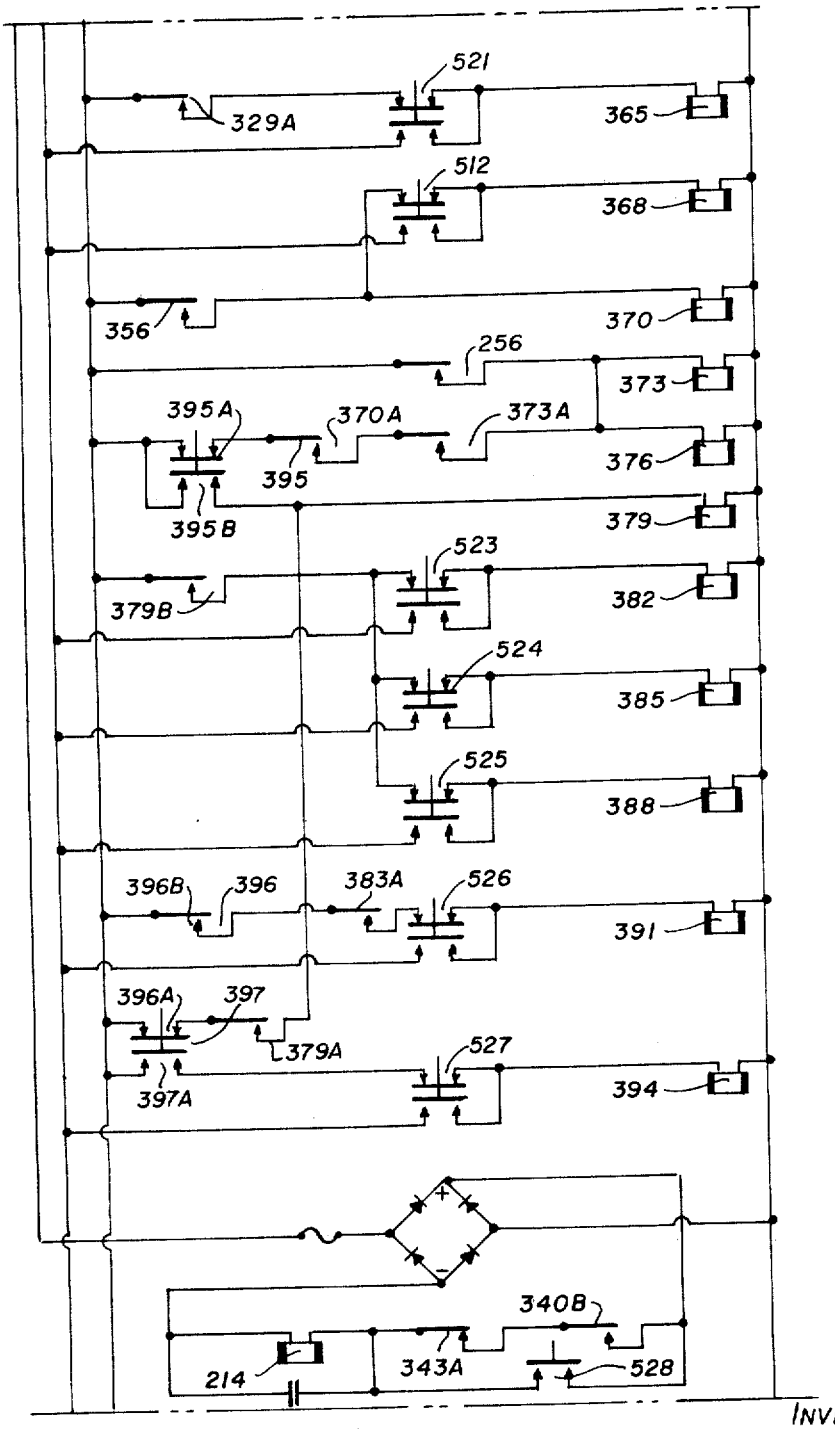
Figure 21:
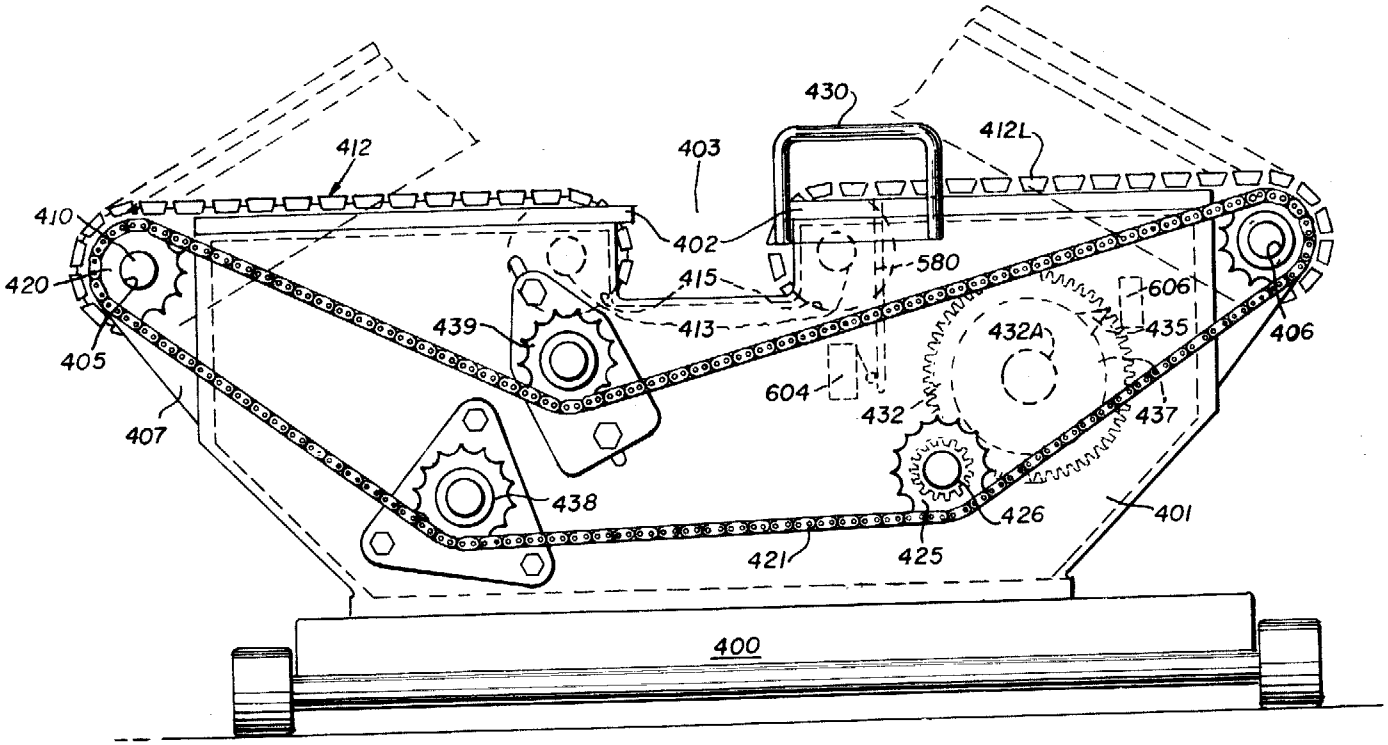
Figure 22:
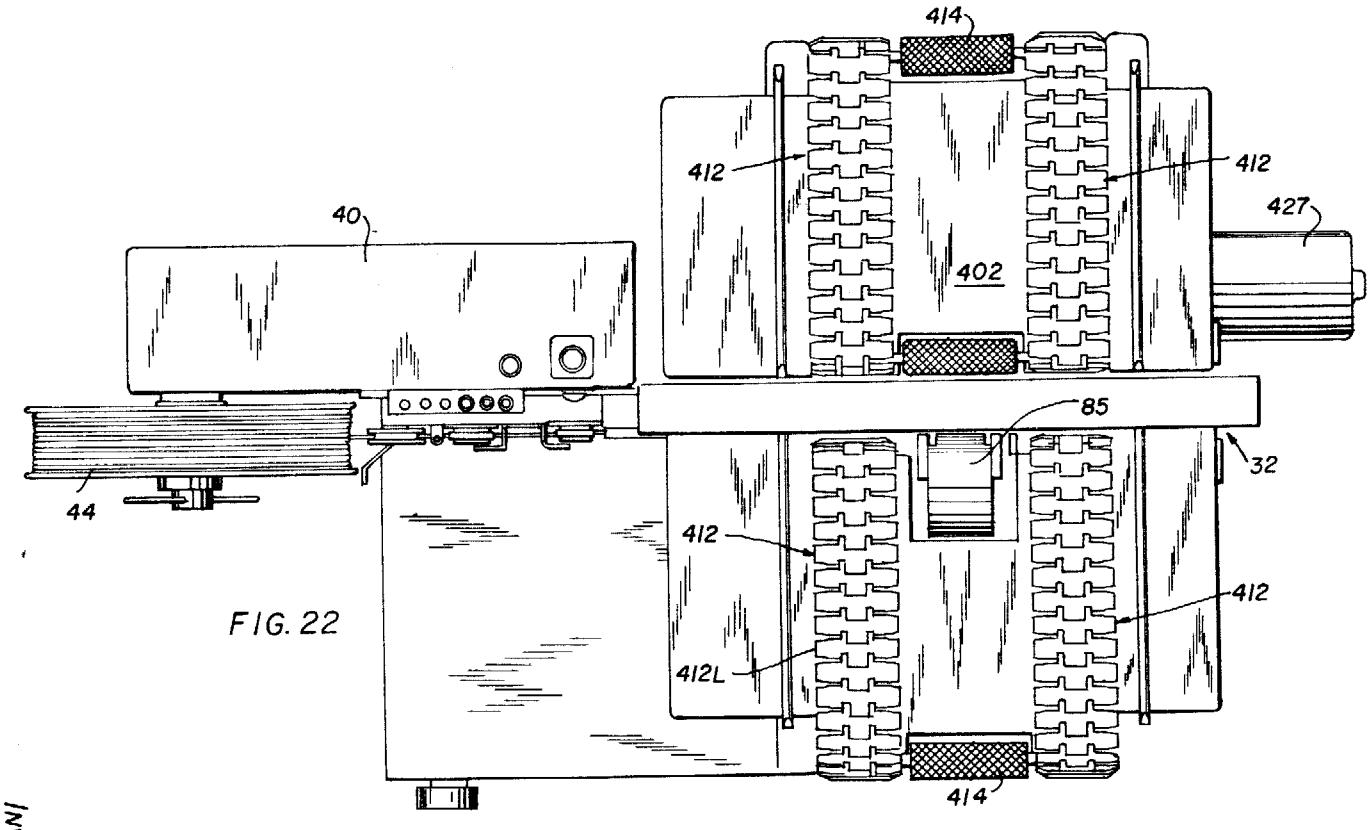
Figure 23:
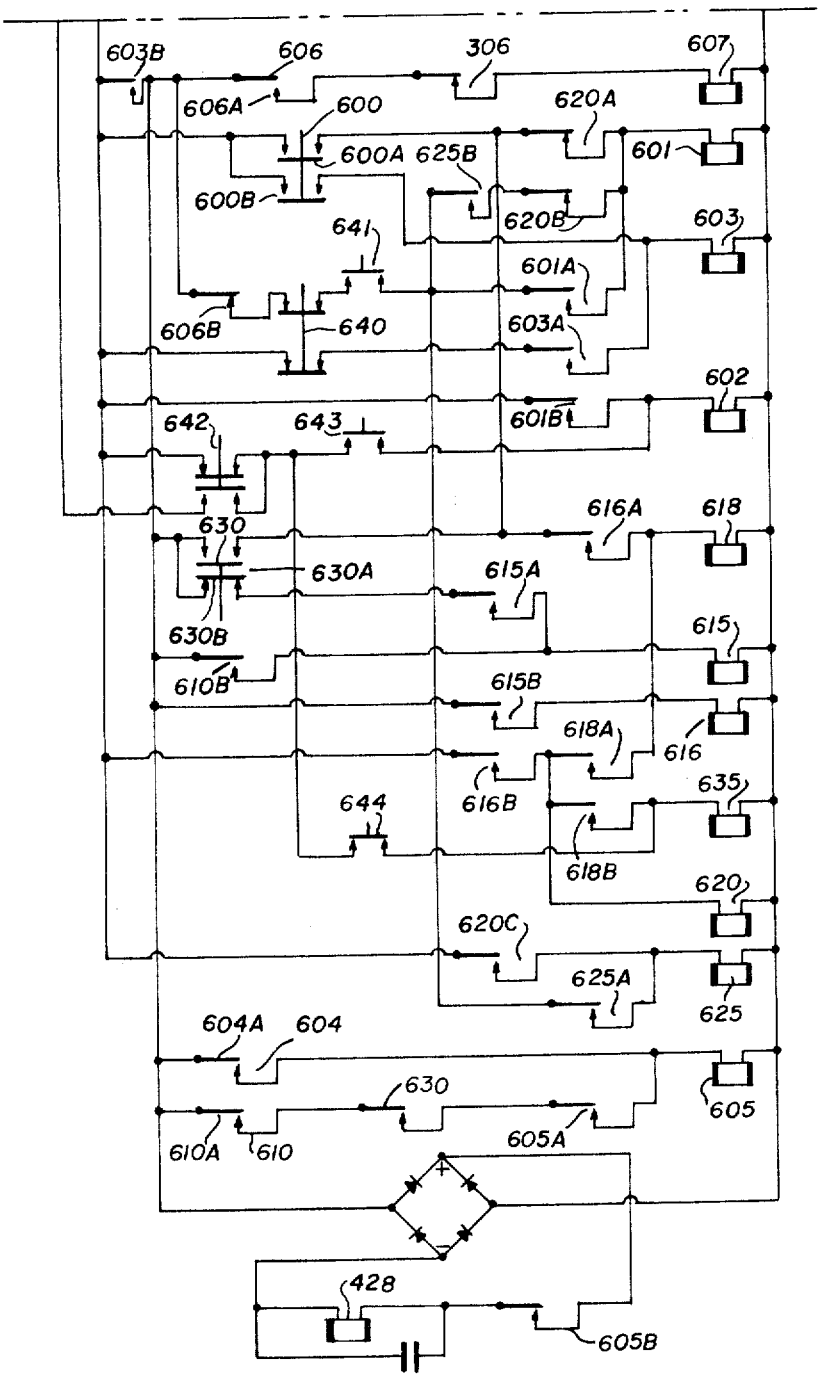
Figure 24:
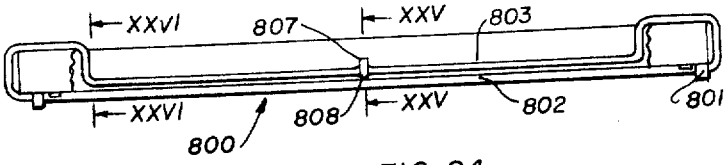
Figure 26:
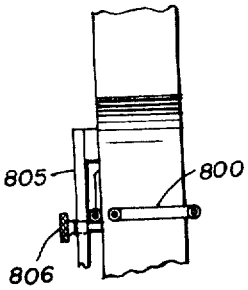
Figure 25:
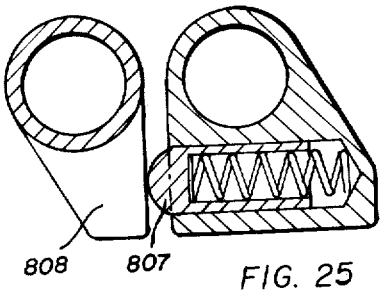
Figure 27:
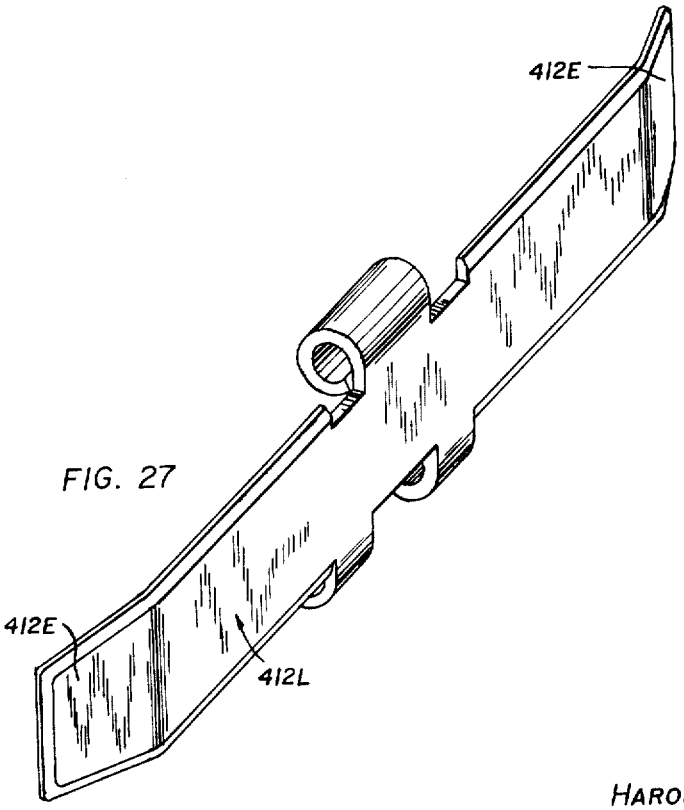

FIGURES 19 and 20 together form a schematic circuit diagram for the wire applying device;

FIGURES 21 and 22 are elevation and plan views of the conveyor device;

FIGURE 23 is a schematic illustration of the circuit diagram which can be roughly considered to continue beneath the diagram formed by FIGURES 19 and 20 but for the purposes of the description certain items in FIGURE 19 have been duplicated in FIGURE 23;

FIGURE 24 is a plan view of a wire arrester for the device as illustrated in FIGURE 1;

FIGURES 25, 26 are sections in the lines XXV—XXV, XXVI—XXVI respectively on FIGURE 24;

FIGURE 27 is a pictorial view of the links in the conveyor chain;

FIGURE 28 is a detail of the conveyor device;

FIGURE 29 is a detail of the cutter looking in the same direction as in FIGURE 7.

With the present embodiment of the invention a bale to be strapped is fed into strapping position within a rectangular loop forming frame. Wire strapping is automatically fed from a reel of wire into the loop forming frame. A loop is formed, is pulled out of the frame, which opens after the loop has been formed, the loop is tensioned about the bale, a knot is twisted in the strap and it is severed from the reel.

Turning now to FIGURE 1 it will be observed that a strap applying device according to the invention comprises basically a strap feeding and tensioning head 30, a loop forming guide member 32, a strap gripping head 34 and strap twisting or knotting device 35.

TENSION AND FEEDING HEAD

A console panel 40 is located at one side of the loop-forming guide member 32 and extending from the console panel is a motor-driven shaft 43 adapted to receive a reel 44 of wire strapping 45. The [drum] *reel* is driven by a reversible motor 60 (see FIGURE 2) and the strapping 45 is adapted to be entrained over a guide roll 50 through a pair of tensioning rolls 51 to a pair of feeding rolls 55 by which it is fed into the loop-forming guide member 32.

The reversible motor 60 is coupled to the shaft 43 for the [drum] *reel* 44 through a gear box 61, gear wheel 62, chain drive 63 and gear wheel 64.

The tension and feeding head 30 on which are mounted the guide roll 50, the tensioning rolls 51 and the feed rolls 55 is slidably mounted in guideways on the front of the console 40 for reciprocation on the console 40 towards and away from loop forming guide member 32. A tension head pneumatic locking cylinder 65 engages a stop in the head at the front of the console and is operable to lock the head 30 in its outward position.

The lower tensioning and feeding rolls 51A and 55A are secured to the head 30 and move therewith. These rolls are driven by a motor 67 (FIGURE 2) through a belt drive 68, a sprocket 69 and a chain drive 70 through gears 71 and 72. The shaft 51S of the lower tensioning roll 51A is provided at its inner end with a sprag 63S (FIGURE 3) which permits of rotation of the roll 51A in one direction only. The shaft 51S is coupled to the sprag through the slip clutch 75 which is arranged to slip at a torque predetermined by a nut and washer arrangement 76 of known form. The shaft carries an arm 77 which is connected to a lever 78 (FIGURE 2) pivoted at 78P to the inside of the console front wall. The top of the lever 78 is arranged to contact a limit switch 320 when the head 30 moves towards the loop-forming guide member 32 due to the application of tension to the strapping sufficient to cause the head 30 to "walk along" the strap and to overcome the bias of a compression spring (not shown). The purpose of the switch 320 and the movement of the head 30 to operate it will become apparent hereinafter.

The top rolls 51B and 55B are mounted on eccentric shafts (FIGURE 3), are driven through gears 51G, 51E and are rocked down into operative position with the rolls 51A and 55A by a pair of reciprocating air motors 65 and 66 through levers 65C and 66C on actuation of the air motors.

LOOP-FORMING GUIDE

Figure 5:
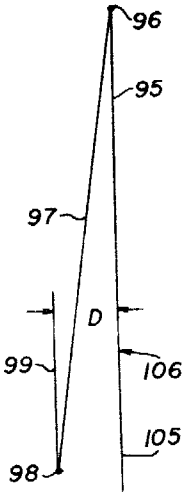
FIGURE 5 is a schematic plan view on a distored scale, of the loop-forming device indicating the manner in which the wire strap is caused to overlap for knotting.

The loop-forming guide member 32 (FIGURES 4, 5, 6, 7, 8) comprises a guideway 90 having a channel or groove 90C in its outer edge, which guideway 90 is securely mounted in a rigidifying frame 91 and arranged for bodily movement therewith within a main frame 92 towards and away from the front thereof. Guideway 90 comprises an entrance portion 95, a first upright portion 96, a top portion 97, a second upright portion 98 and a return portion 99. Reference to FIGURE 5 will show that the entrance portion 95 and the return portion 99 are spaced apart from each other. The spacing is caused by the offset in the top portion 97 and this offset is exaggerated in FIGURE 5 for the sake of illustration. The distance D between the entrance portion 95 and the return portion 99 is in fact not much greater than the width of the strapping wire. This offset enables the return portion of the strap to be led behind the entrance portion of the strap and thus to provide at the centre of the bottom of the guideway a pair of parallel running strap sections which in the strapping operation are twisted to form a knot.

When the guideway 90 is in the forward or loading position the channel therein forms with the front panel 100 of the main frame a closed track for the strapping wire and the front panel 100 prohibits lateral movement of the strapping wire out of the channel.

Figure 11:
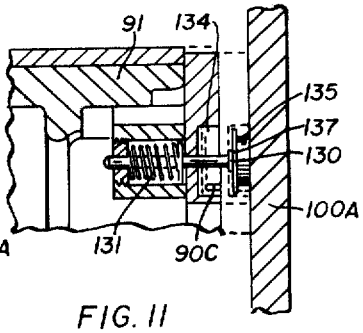

The guideway 90 has rounded corners and at these corners recesses are cut into the outer surface of the guideway to receive the periphery of rollers 136 (see FIGURES 6 and 11) mounted on the rigidifying frame 91. In this manner the strapping wire when being threaded into the channel 90C in the front face of the guideway 90 has a relatively friction-free passage around the guideway since it runs on the rollers 136 at the corners.

The offset in the top portion 97 of the guide is compensated for by variation in thickness in the front plate 100A of the main frame 92 so that the front plate presents a flat and level configuration to an outside observer.

As best seen in FIGURE 7 (which shows the main frame with the left-hand lower side of the front panel 100 removed) a gap exists between the entrance portion 95 and the return portion 99 of the guideway 90 and the entrance portion 95 does not extend beyond the centre line of the guide member 32 in the direction of the feeding rolls. This gap is closed and the guideway 90 thus completed by a tiltable feeding track arm 105, biased downwardly by a spring 105S, and a gate 106 (see also FIGURE 9). The feeding track has a strapping-wire receiving-channel in its upper surface and it is into this channel that the strap is fed by the tension and feeding head 30 from the reel 44. The gate 106 has a lip in its inner surface to provide a complete loop-forming guideway for the strapping wire. The front run 45F of strapping wire, when it leaves the feeding track member 105, passes beneath a lip 106C of the gate 106 on top of an under-guide 104 and is separated from the rear run of strapping wire 45B by a barrier or separator member 94.

Figure 6:
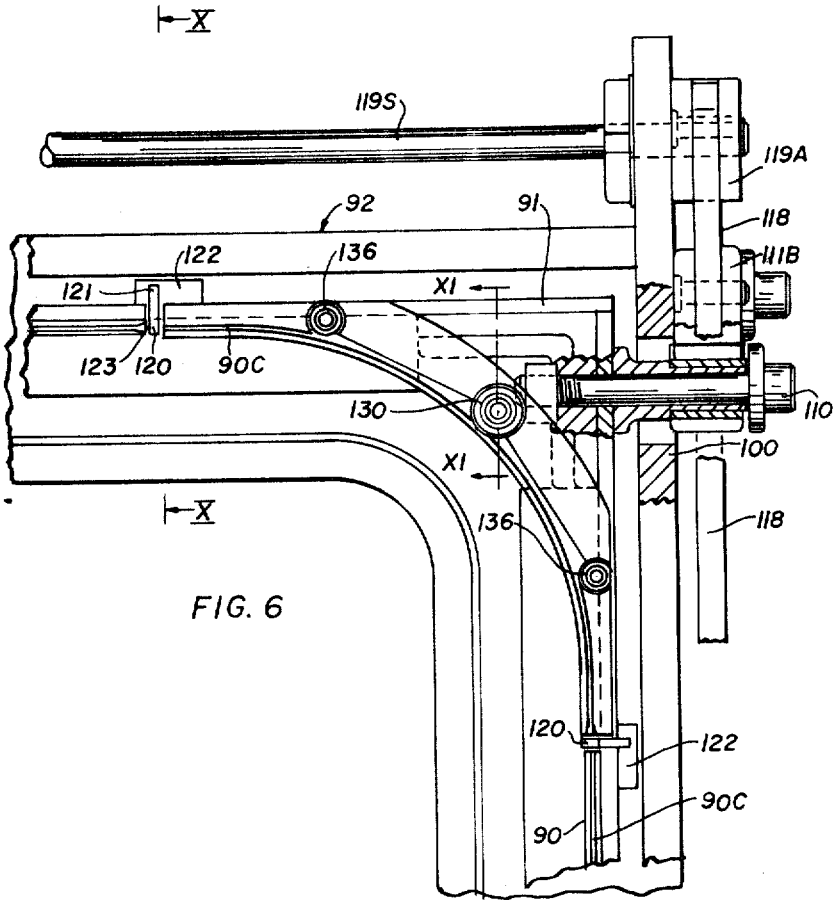
FIGURE 6 is a detail of a corner of the loop-forming device.

The frame 91 is provided, as best seen in FIGURES 4, 6, 7 and 8 at each of its corners with outwardly extending stub shafts 110, 111, 112 and 113 which, when the frame 91 is in place on the main frame 92, extends through apertures in the side plates 100S of the main frame (FIGURE 6).

Figure 9:
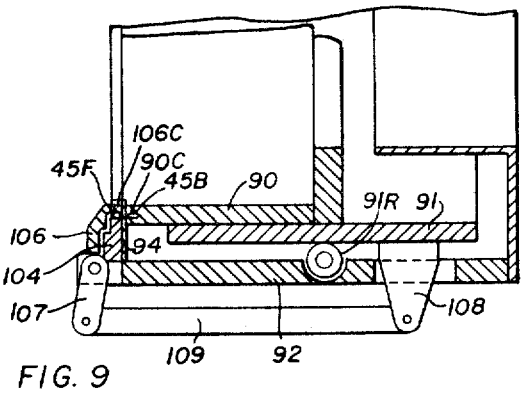
FIGURE 9 is a detail of a section taken on the line IX—IX in FIGURE 7.
Figure 12:
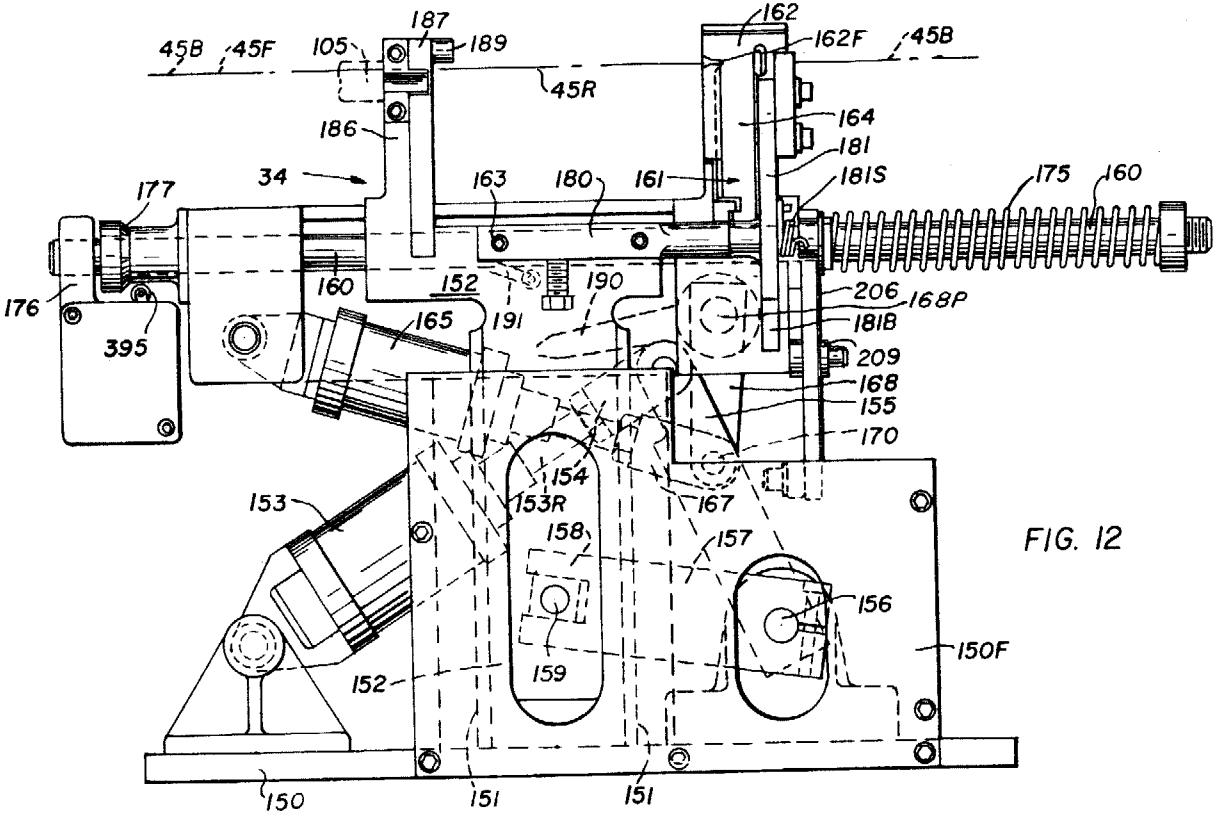
FIGURE 12 is a front view of the gripper device.
Figure 15:
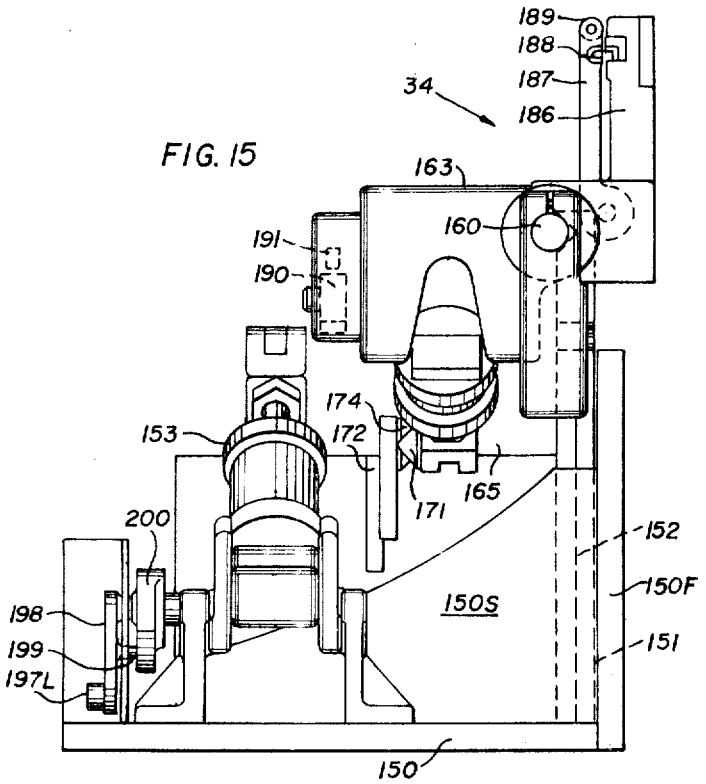
FIGURE 15 is an end view of the gripper from the end opposite that shown in FIGURE 13.

The stub shafts 110, 111, 112, 113 are connected externally of the main frame 92 to a linkage 115 comprising links 116, 117 and 118. Links 116 and 117 are connected at their tops by a double crossbar 119 which through a shaft 119S connects with a single crossbar 119A to the link 118. Links 117 and 118 carry pivoted bell cranks 111B, 111C, 111D, 111E which engage shafts 110, 111, 112 and 113. Link 116 is connected through bell crank lever 116C to an air motor 114. The frame 91 is mounted on rollers in the bottom of the main frame 92. One of the rollers 91R is seen in FIGURE 9. Operation of the air motor 114 when a loop of strapping has been formed causes the link 116 through crossheads 119 and 119A to move links 117 and 118 which through bell crank levers 111B, 111C, 111D, 111E bodily displace the frame 91 which its guideway 90 comprising its entrance portion 95, upright portion 96, top portion 97, second upright portion 98 and return portion 99, backwards on the rollers 91R within the main frame 92 away from the front plate 100A. At the same time, the frame 91 carries back with it a depending member 108 (FIGURE 9) which pulls on the link 109 to rock the link 107 and thus the gate 106 is rocked back clear of the front run of strapping wire 45F and leaves this run resting on the guide 104.

Figure 10:
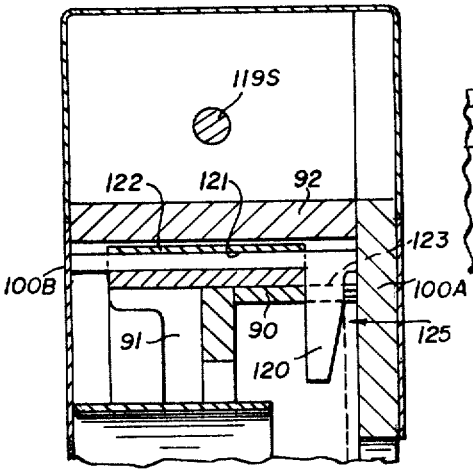
FIGURES 10 and 11 are details of the stripping device taken on the section lines X—X and XI—XI of FIGURE 6 respectively.

Mounted around the periphery of the frame 91 are a plurality of stripping pins 120 for stripping the formed loop from the guideway 90. These pins are completely free to slide in slots 121 (see FIGURES 6 and 10) in housings 122 on the rigidifying frame 91 and in slots 123 in the guideway 90. The pins extend beyond the frame at front and rear so as to be constrained within the main frame 92 by the front plate 100A and the rear plate 100B thereof. The pins 120 are undercut rearwardly at 125 and extend into the path of the guide channel 90C the undercutting providing for the loading of the straps into the channel 90C of the guide 90 when the frame 91 is in the forward position. It will be seen that when the frame 91 is moved rearwardly within the main frame 92 by the action of the air motor 114 the pins 120 cannot move since they abut against the rear plate 100B and thus the guide 90 moves relatively to the pins 120 and the notches 125 in the pins, which engage the strapping wire in the channel 90C, strip the strapping from the channel 90C of the guide 90. It is in this manner that the strap formed into loop configuration is removed from the loop-forming device 32. This stripping action is assisted by the spring loaded corner rollers 130 (FIGURE 11) which are biased outwardly of the frame 91 by springs 131. When the frame 91 is in the forward position the rollers 130 are retracted in their housings 134 and offer a smooth periphery 135 to the wire 45 in the channel 90C so that they cooperate with the fixed rollers 136 in providing for a smooth corner passage for the strapping wire but when the frame 91 is moved rearwardly the flanges 137 on the rollers 130 assist the stripping pins to expel the strapping wire from the channel 90C and to allow the removal of the excess strapping formed in the loop so that it conforms to the sides of the package before the centre portion of the wire is released onto the bale.

In order to ensure that the strapping wire is free of the guideway 90 at all points before it is pulled, by the action of the tension rollers 51 onto a package, a retaining device 800 (FIGURES 1, 24, 25, 26) is provided to momentarily restrain the strap after stripping.

The retaining device 800 comprises an endless tubular member 801 which provides a pair of closely arranged stops 802, 803 which extend across the front of the strapping device and encircle the upright sides thereof. A pair of perforated racks, one of which is shown in FIGURE 1 and indicated as 805, are provided, one on each side of the strap applying device and the height of the member 800 of the device can be adjusted merely by removing the pins 806 and moving the member 800 up or down and replacing the pins 806 in selected holes. It is necessary to adjust the height of the retaining member 800 in order to accommodate different size of bales. When the wire has been stripped from the guide member it falls between the stops 802, 803 and is momentarily arrested by the action of the plunger 807 against the depending face 808 until the action of the tension rollers 51 pull the strap past the plunger 807 and onto the package.

THE GRIPPER

The gripper head 34 (FIGURES 12 through 16) is located at the centre of the loop-forming guide member 32 on a base plate 150 having a front wall 150F and side walls 150S. The base plate 150 has vertical gibs 151 extending upwardly therefrom behind the front wall 150F. A supporting frame 152 is mounted for vertical reciprocation in the gibs 151. The supporting frame 152 is vertically reciprocated by the piston and cylinder air-motor 153. The extremity of the piston rod 153R is provided with a clevis 154 to which is attached a link 155 connected to shaft 156. Mounted on the shaft 156 is a link 157 having a bifurcated end 158 which engages with a crank pin 159 on the supporting frame 152. Extension of the piston rod 153R in the cylinder 153 rocks the link 155, the shaft 156 and the link 157 to raise and lower the supporting frame 152 and the gibs 151.

Connected to the top of the top of the supporting frame 152 is a traversely extending shaft 160. Mounted on the shaft 160 so that it may rock about the axis thereof relative to the supporting frame 152 is a gripper head assembly 161. The gripper head assembly 161 comprises: a fixed upper gripper jaw 162, having a stop face 162F; a tilting frame 163, to which the jaw 162 is firmly connected and a moveable lower jaw 164. The jaw 164 is raised and lowered into closed and open position by a pneumatic cylinder and piston arrangement 165. The clevis 167 on the outer end of the piston rod of this arrangement is connected through a clevis pin 170 to a link 168 which is connected through an eccentric 169 to the jaw 164 (FIGURE 14). Actuation of the cylinder 165 causes the rocking of the arm 168 on the eccentric 169 about a pivot point 168P providing for the raising and lowering of the gripper jaw 164.

Extending from the rear of the clevis pin 170 is a conical cam engaging surface 171 (FIGURES 13, 15 and 16) rigidly secured to the base plate 150 is a projecting bracket 172 carrying a cam face 175.

The gripper assembly 161, in addition to being mounted for rocking action about the shaft 160 is also arranged for limited axial movement on the shaft against the bias of the spring 175. On the end of the shaft 160 remote from this spring 175 is provided a bracket 176 carrying a switch 395 which is actuated by a trip element 177 on the frame 163. Thus, relative movement of the frame 163 axially of the shaft 160 to the switch 395 (caused by the action of the leading end of the strapping wire being fed into the gripper assembly 161 to abut against the stop face 162F) causes the member 177 to engage and trip the switch 395.

Extending across the front of the supporting frame 152, and rigidly attached thereto, is a projecting member 180 to which is attached a bushing 180B carrying a goose-necked guide finger 181 mounted for rocking about the bar member 180 and spring biased by a torsion spring 181S into a normally inward position. The goose-necked guide finger 181 is provided with a slot 185 which engages the front run 45F of the wire 45 in the guide member 32 through slot 106S in the gate 106. Also attached to the frame 152 at the end remote from the guide finger 181 is a front lift finger 186 for the front run 45F of the strapping wire. Behind and pivotally attached to the finger 186 is a rear lift finger 187 (FIGURE 15) provided with a strapping wire engaging slot 188 and a bumper pad 189.

Mounted on the back of the tilting frame 163 is a switching arm 190 connected to the eccentric 169 and a switch 191. Operation of the piston and cylinder arrangement 165 to rock the arm 168 to open the jaw 164 causes the switching arm 190 to engage with a trip the switch 191 for the purpose which will become apparent hereinafter.

Mounted on the base plate 150 at the rear thereof is a switching panel 193 carrying three switches 328, 329, 397 operated by a cam bar 197 having three switch tripping cams 328c, 329c, 397c thereon. The cam bar 197 terminates in a bifurcated link 197L which is connected to the lower end of a bell crank lever 198. The bell crank lever 198 is pivoted at 198p to the panel 193 and at its upper end is connected to the pin 199, and then through a crank lever 200 to the shaft 156. Thus, when cylinder 153 rocks the shaft 156, it, in turn, moves the cam bar 197 through the bell crank lever 198 to slide the cam bar 197 so that the switches 328, 329, 397 are operated by their tripping cams.

Secured on the frame 163 adjacent the gripper jaw 162 is a hollow trunnion 205 (best seen in FIGURE 13) which carries a guide lever 206 pivotally mounted thereon. At the lower extremity of the guide lever 206 is a roller 207. Midway on the lever is a slot 208 which engages with a stub shaft 209 which is fixed to the frame 163. Adjacent this point the lever is engaged by a spring pressed plunger 210 housed in a bracket 211 on the frame 163. The guide lever 206 functions to return the gripper head assembly to the upright position at the end of the strapping operation as will become apparent hereinafter.

The twister

Figure 17:
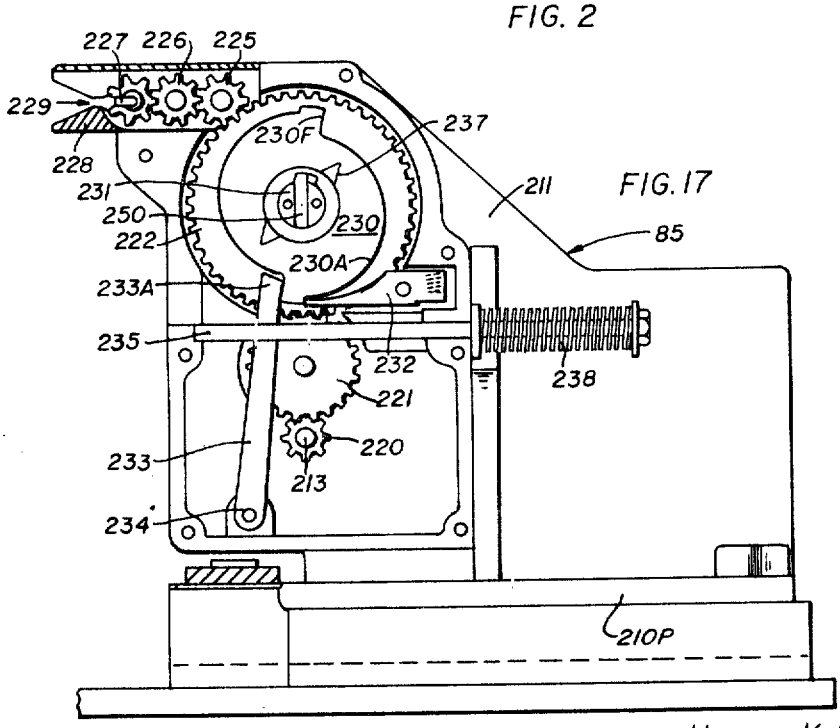
FIGURE 17 is a detail of the twister looking from the right as seen in FIGURE 1 and with the side plate removed.
Figure 18:
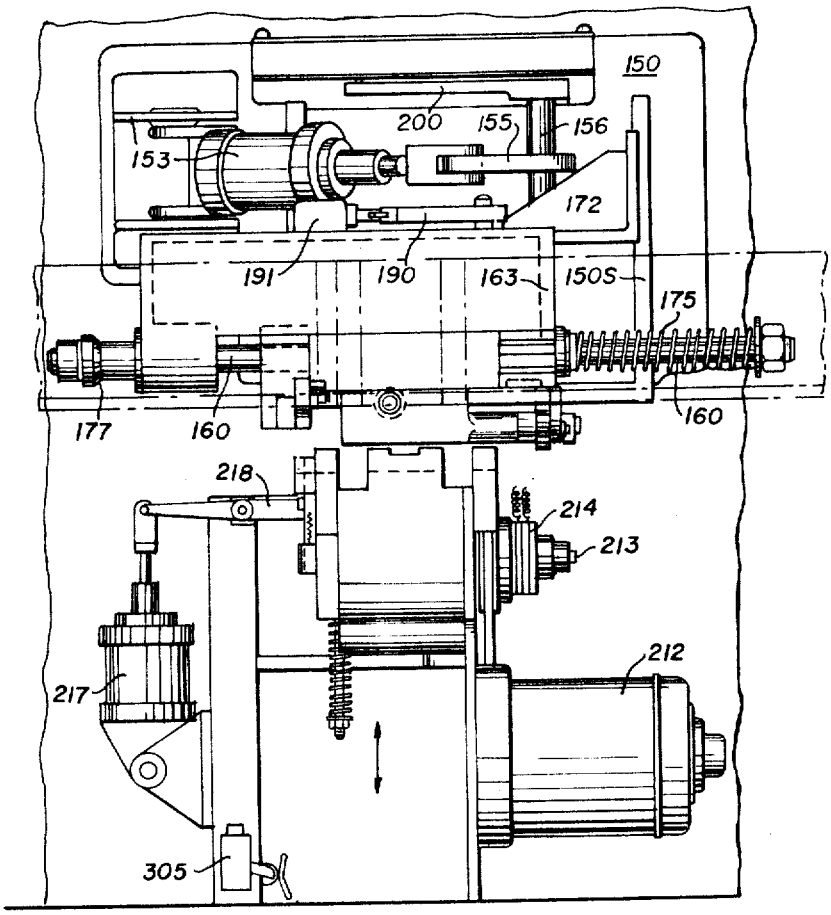
FIGURE 18 is a plan view of the gripper and twister with the latter disengaged from the wire.

The twister assembly 35 (see FIGURES 1, 17 and 18) is mounted on a base in gibs 216 in the floor plate 210P (FIGURE 17) and is reciprocated in the gibs 216 by a pneumatic motor 217 (FIGURE 18) through a linkage 218 to move into and out of engagement with the front and rear strapping wires 45F and 45B. An upstanding plate 211 is located centrally of the assembly 35 to carry on one side the motor 212 which during operation is normally running in one direction. A belt drive connection is made from the motor 212 with a shaft 213 through an electrical clutch 214 to drive the driving gear 220 (FIGURE 17). The driving gear 220 drives, through an idler 221, a large gear 222 which in its turn, through a pair of small idler gears 225, 226, drives the twisting pinion 227 in the goose-neck extension 228 on the twister assembly 35. The actual height of the goose-neck extension 228 above the floor plate 210 is greater than the height of the gate 106 (especially FIGURE 7). Therefore, it is not until the front and rear strapping wire 45F and 45 which lie parallel and overlapping the gripper 163 and lifting fingers 181, 186, 187, have been lifted out of the guideway 90 under the action of the piston 155 to the operational level of the slots 185, that the twisting pinion 227 can engage the overlapping run 45R (FIGURE 12) of strapping wire.

Integral and coaxial with the big gear 222 is a cam 230 of the normal rise-and-fall-stepped variety with the steps spaced apart 180°. The big gear wheel 222 is keyed to a shaft 231 which carries a cutting cam 237 in its outer extremity. The rise and fall cam 230 is constrained against backward movement by a spring biased stop member 232 and on operation moves a lever 233 outward about its pivot 234 in an anticlockwise direction as viewed in FIGURE 17. The pivoted lever 233 engages in a slot in a sliding link 235 which is spring biased by a spring 238 to return the lever 233 from its outward position.

The electric clutch 214 when initiated, operates on a time delay basis and through the gearing aforesaid drives the cam 230 from its starting, or rest, position as indicated in FIGURE 17 through one-half revolution, that is to say the rise portion 230A of the cam 230 carries the lever 233 outward, passes over the bevelled end 233A of the lever which immediately tends to return under the action of the spring 238 until it is engaged by the next face 230F (FIGURE 17) of the cam and then owing to the time delay the cam moves slightly more than 180° and again moves the lever forward against the action of its spring. At this time the time delay assoicated with the electric clutch cuts out and the cam face 230F which has not passed over the bevelled end 233A of the lever is halted and is returned by the natural resistivity of the strapping wire to "over-twist" and by the action of the spring 238 to the rest posttion to engage the stop member 232.

In this fashion the strapping wire runs 45F and 45B are twisted together through three full turns by the twister pinion 227 and then goes into an additional one-sixth of a twist or "over-twist" the "over-twist" being taken out of the wire by the returning action of the lever 233 until the cam engages the stop 232.

A cutter knife actuating lever 240 is pivoted to the outer plate 239P of the casing 239 of the twister assembly 85. The lever 240 is spring biased by a spring 241 connected to the plate 239P to normally urge the cutter blade 245 away from the wire.

This cutter blade 245 is operated to sever the wire 45F at the point of applying "over-twist." The cutter cam is keyed to the shaft 231 through a key 250 which is arranged to permit of a certain degree of lost motion between shaft and key. In this fashion the severing of the wire 45F from the feed roll 44 is accomplished only at the point of over-twist. In my United States Patent No. 2,877,808 dated Mar. 17, 1959 I have described in detail the arrangement of the lost motion device to permit of the actuation of the cutter and since this operation is well known in the art it is not considered necessary to go into further detail on the matter at this point.

When the twister assembly is moved into engagement with the overlapper wire 45R the finger 181 on the gripper head assembly is rocked out of engagement with wire 45F by contact of the twister head assembly with the butt 181B of the finger. The rear finger 187 is also rocked backwards out of engagement with the rear wire 45B by the twister assembly 85 contacting the bumper bushing 189. The severing of the wire 45F takes place immediately to the right (when viewed in FIGURE 12) of the finger 186.

Operation of the wire apply device

The operation of the device referred to above will now be described with reference to the electrical schematic cricuit diagram (FIGURES 19 and 20).

The starting position for this description is with the strapping wire 45 stripped from hte guide 90 and formed in a loose loop about the bale to be strapped, the free end of the back run 45B of the wire 45 being held in the closed jaws 162, 164 of gripper head assembly 161, which assembly is in the "up" position in the gibs 151, the lifting guide fingers 181, 187 having been retracted out of engagement with the front and back runs 45F, 45B of the strapping wire 45 by the twister head assembly 85 which is in its normally "forward" position engaging the runs 45F and 45B of the strapping wire in its twister pinion. The track arm 105 being tilted upwardly to a horizontal position by the finger 186 which acts as a guide for the run 45F.

In the circuit diagram, the main power switch 300 is shown in the "on" position. The manual-automatic operation selection switch 301 is shown with the "auto" position selected. The twister motor 212 switch 302 is in the "on" position so that the motor 212 is running. The switch 303 for the feed and tensioning motor 67 is in the "on" position since it has just completed the treading of the strap in the guideway 90. The twister head assembly 85, in moving to its "forward" position, closes normally open contacts 305c of the limit switch 305 on the base plate 210 and its normally open contacts 305D are momentarily closed, energizing the solenoid valve 310 to retract the tensioning head locking cylinder 46 (FIG. 1), the solenoid valve 311 energizing the cylinder of air-motor 65 to close the tensioning rolls 51A through lever 65L, the reversing coil 313 of the reel motor 60 starting the reel motor 60 in reverse and control relay 306 normally open contacts 306A sealing in the reversing coil 313 to ensure the continued reverse running of the reel 44 of strapping wire.

Figure 2:
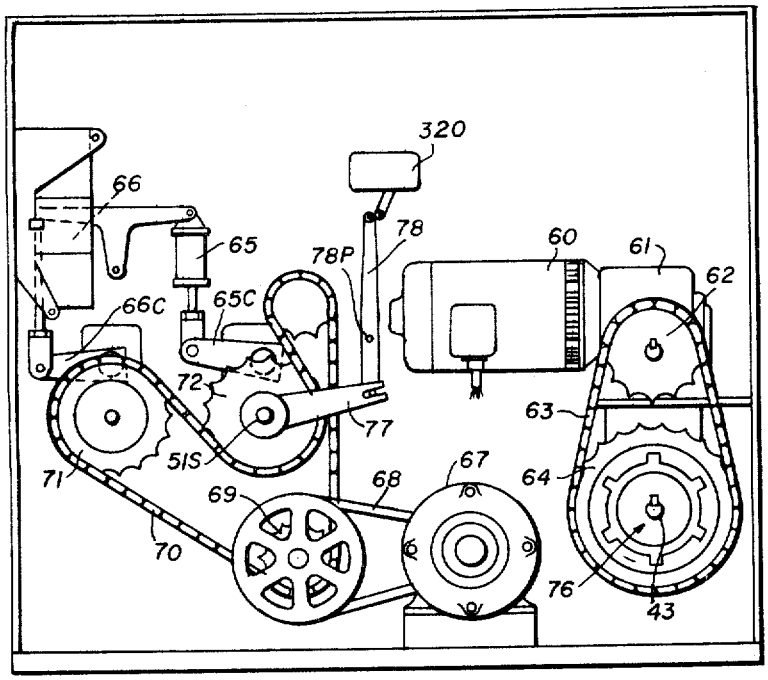
FIGURE 2 is a view of the console seen from the rear with the rear cover removed.
Figure 3:
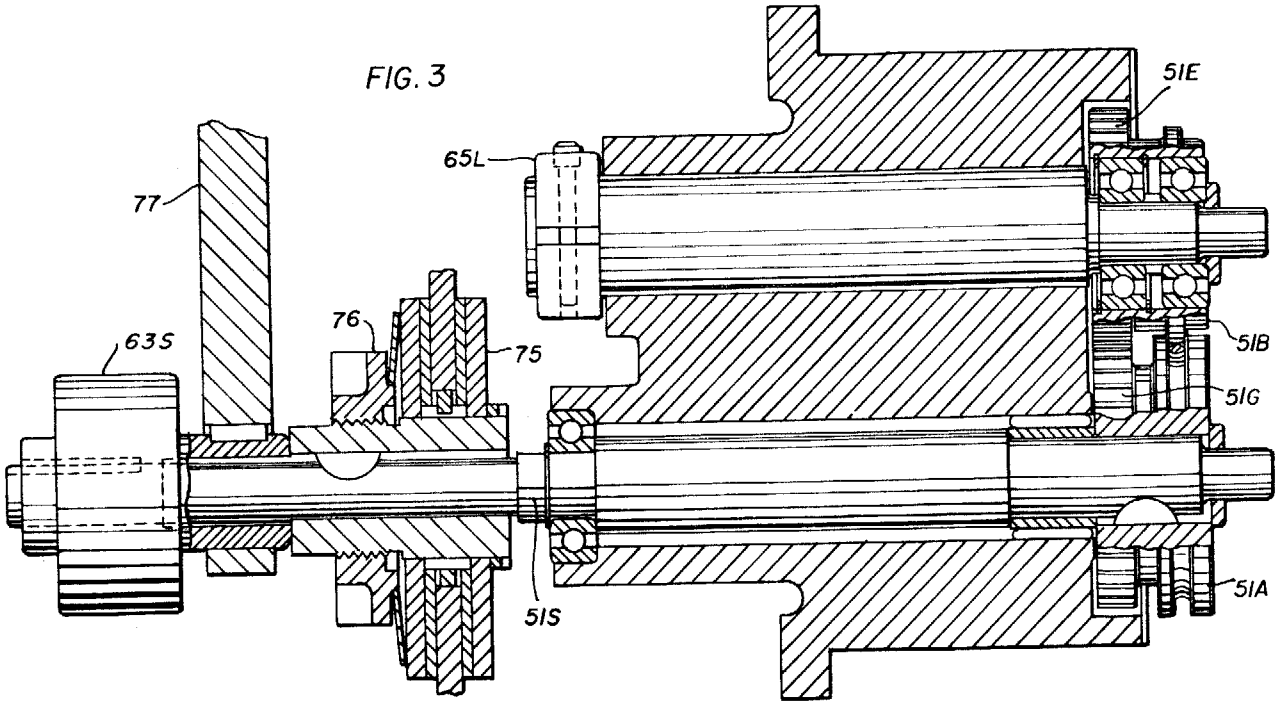
FIGURE 3 is a section through the feed and tensioning roll showing the details of the mountings of those rolls.
Figure 4:
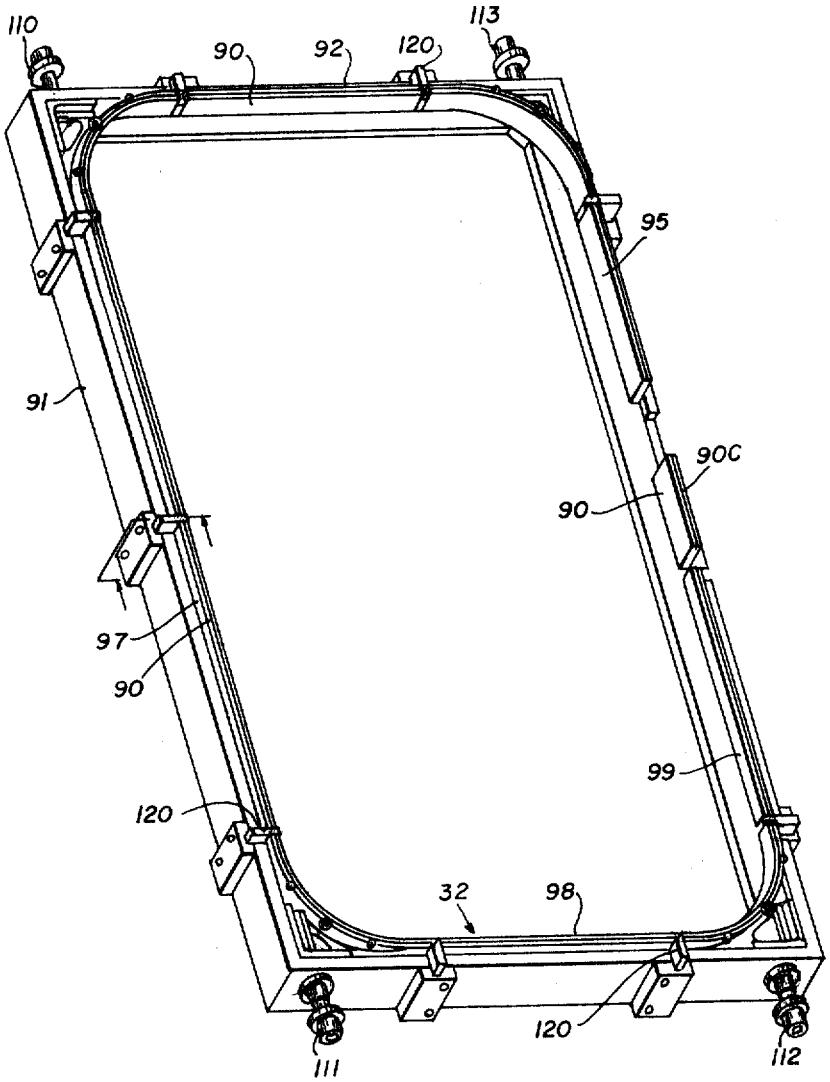
FIGURE 4 is a pictorial view of the loop-forming strapping guide mounted in its supporting frame.

Thus, the tensioning head 30 comes forward by walking along the wire 45 when it reaches the preselected tension and through arm 77 and lever 78 engages and actuates the limit switch 320 in the console 40 (see also FIG. 2). Normally closed contacts 320A of the limit switch 320 open, deenergizing the control relay 306. Normally open contacts 306A of the control relay 306 open, deenergizing the reversing coil 313 and strapping reel motor 46. Normally open contacts 320B of the limit switch 320 close, energizing the control relay 324 and the time delay switch 325.

Normally open contacts 324A of the control relay 324 close sealing in the time delay relay 325 which runs to ensure that the clutch 76 on the tension roller shaft 51S slips before the twisting of the knot. Normally closed contacts 325A of the time delay relay 325 then open, deenergizing the starting coil 333 of the tension and feed motor 67, thereby stopping the motor. Normally open contacts 325B of the time delay relay 325 close, energizing the control relay 340 and the twister time delay relay 343. Normally open contacts 340A of the control relay 340 close, sealing in the twister time delay relay 343. Normally open contacts 340B of the control relay 340 close, engaging the twister clutch. Since the motor 212 is already running operation of the twister clutch 214 drives the shaft 213 which drives the gear 222 and the cam 230 operates to twist the wire and sever it from the reel 44. Normally closed contacts 343A of control relay 343 open, deenergizing the twister clutch. Normally open contacts 343B of the time delay relay 343 close, energizing the solenoid valve 311 to open the tensioning rolls by operating the cylinder 65, the solenoid valve 363 to advance the tensioning head locking cylinder 299, the solenoid valve 360 to open the gripper by actuating cylinder 165, thus, through arm 190, actuating the limit switch 191 which acts to open its normally closed contacts 355A to deenergize the control relay 324, to open the normally open contacts 324A of the control relay 324, deenergizing the time delay relay 325 to close the normally closed contacts 325A to energize the starting coil 333 of the tension and feed motor 67, starting the feed and tension motor; to close the normally open contacts 355B of the limit switch 191, thereby energizing the solenoid valve 153 for the gripper head, lowering the gripper head down, thus, actuating, through cam bar 197, the limit switches 328 and 329.

As the gripper head is opened, the cam elements 171 and 175 are engaged and the gripper head assembly is rocked rearwardly about shaft 160 to disengage the upper gripper jaw 162 from the strapping wire. As the cam elements 171, 175 disengage due to the lowering of the gripper head assembly 161 in gibs 151 the gripper head assembly is returned to the upright position by the plunger 210 acting on the guide element 206. Normally open contacts 329A of the limit switch 329 close, energizing the solenoid valve 365 to operate the cylinder 217 to retract the twister head which mechanically contacts and actuates the limit switch 383 closing its normally open contacts 383A and opening the contacts of the interlock limit switch 305. Normally closed contacts 328A of the limit switch 328 open, deenergizing the control relay 340. Normally open contacts 340A of the control relay 340 open, deenergizing the time delay relay 343. Normally open contacts 328B of the limit switch 328 close, energizing the solenoid valve 350 to operate the cylinder 117 (see FIG. 8), closing the strapping guides 90 against the front panel 100 in a position to receive fresh strapping wire from the reel 44. This closing of the guide 90 actuates the limit switch 356 which, in its turn, energizes the solenoid valve 368 to operate the cylinder 66 to close the lower feed roll 55A through lever 66L and its eccentric mounting, the time delay relay 370, the control relay 373, the feed coil reel motor 376 starting the reel motor 60 in the feed direction, the normally open contacts 370A of the time delay relay 370 and the normally open contacts 373A of the control relay 373 to close to seal the "forward" coil 376 of the reel motor and the control relay 373.

The strapping wire is thus fed, or more correctly, threaded, along the tiltable feeding track member 105 through the gate 106, into the entrance portion 95 of the guideway 90, up its first upright portion and through its return portion 99 behind the separator 94 to form the adjacent front and back runs 45F and 45B into the gripper head assembly 161 where it passes beneath the upper gripper jaw 162 and abuts against the stop face 162F to move the assembly 161 against the action of the spring 175 to cause the trip element 177 to actuate the limit switch 395.

Normally closed contacts 395A of the limit switch 395 open releasing the control relay 373 and the "forward" coil 376 of reel motor 60 stopping the motor.

It is to be noted that if the time delay relay 370 ran out before the limit switch 395 was actuated, then normally open contacts 370A would open, braking the "seal in" of the control relay 373 and the "forward" coil 376 of reel motor 60, thus stopping the reel motor 60.

With the actuation of the limit switch 395 the normally open contacts 395B of that limit switch close, energizing the control relay 379, and normally open contacts 379A close to seal in the control relay 379. Normally open contacts 379B of the control relay 379 close, energizing a solenoid valve (not shown) to open the feed roll 55A and the solenoid valve 385 to operate the cylinder 165 to close the lower gripper jaws 164 and operates the cylinder 117 to move the strapping guideway 90 back from the panel 100, thus causing the strap to be stripped from the guideway 90. The gate 106 tilts back away from the wire and it is thus held in the gripper head 161 and the fingers 181, 186, 187. The strapping guideway 90, in moving, actuates the limit switch 396. Normally closed contacts 396A of limit switch 396 open, releasing the control relay 379 and normally open contacts 396B of the control relay 396 close, energizing the solenoid valve 391 to operate the cylinder 153 to bring the gripper head up. The gripper head assembly together with the lifting fingers 181, 186 and 187 which are contacting the front and rear runs 45F and 45B of the strapping wire lift the wire up to the level of the twister pinion 227. In lifting, the gripper head actuates the limit switch 397 through the cam bar 197, thus closing the normally open contacts 397A of the limit switch 397 to energize the solenoid valve 394 to operate the cylinder 217 to bring the twister head into engagement with the run 45F and 45B of the strapping wire lift the wire up to the level of the twister pinion 227. In lifting, the gripper head actuates the limit switch 397 through the cam bar 197, thus closing the normally open contacts 397A of the limit switch 397 to energize the solenoid valve 394 to operate the cylinder 217 to bring the twister head into engagement with the run 45F and 45B of strapping wire. Movement of the twister head actuates the limit switch 305 and the normally open contacts of this limit switch are thus closed for a recycle.

Switches 510 and 528 are the manual switches for operating all cylinders in both directions for purposes of testing. The provision of these switches enables an operator to perform individual functions separately by the selection of the specific button. For example, if the operator desires to open the gripper head he pushes the button 519 whereas to close the gripper head he pushes the button 524. Similarly, if he wishes to actuate the cylinder 117 to move the strapping guideway 90 forward to the strap receiving position he may do so by pushing the button 515. He may not however apply a strap since the manual buttons are, as have been stated, for the purpose of testing and retiming only.

Turning now to FIGURES 21, 22, 23 and 28 which illustrate the conveyer associated with the strap applying device just described, the conveyor on its own and the sequencing circuit for operating the conveyor with the strapping device.

It will be appreciated that the device described above is completely automatic insofar as the application of a single strap is concerned but in certain strapping operations it is necessary to tie more than one strap on a bale and the more usual form of strapping comprises a pair of straps spaced apart on the longitudinal axis of the bale and about it and a third strap encircling the bale transversely. It will be further appreciated that two of the strapping devices described above may be used in tandem, that is, the first device may apply the straps longitudinally and the bale may then be conveyed from the first strapping device turned through 90° and passed into the second device to apply the third strap. The conveyor of the present device may be used, with minor adjustments, for use with a single wire strapping device or with a pair thereof in tandem.

The conveyor is of the endless chain type and is mounted on a base 400 which extends beneath and in front of and behind the loop applying element 32 of the strapping device to form bale feeding and withdrawal sections for the conveyor. The conveyor has a pair of upstanding side walls 401 which are spaced so as not to interfere with the strapping device and its gripper and twister heads and a pair of top plates 402 one for the feed section and one for the withdrawal sections which rest on the side walls 401 in operational position. The plates 402 are arranged so that they do not meet and the side walls 401 are recessed so that there is pivoted a working station 403 to accommodate the strap applying guideway 90, gripper head and twister head. The feed and withdrawal sections of the conveyor are substantially the same as each other and thus the feed section alone will now be described in detail.

The plates 402 are mounted on bearings 405, 406 (FIGURE 28) to an anchor plate 407 rigidly secured to side arms 401. The bearings 405, 406 receive the transverse shaft 410, on which shaft are a pair of spaced conveyor sprockets 411 each of which drive an endless chain conveyor 412 made up of a plurality of chain links 412L (see FIGURE 27). Each chain conveyor is entrained over a sprocket 415 on an idler 413 located at the other extremity of the plate. Between the sprockets 411 in the shaft 410 is a centrally located knurled cylindrical roller 414. The chain conveyors rest upon the top of the plate 402. The idler shafts 413 are mounted in individual bearing blocks and are freed to slide to adjust tension in the conveyor by means of a tensioning bar and adjustment.

At the end of the shaft 410 there is provided a chain drive sprocket 420 which entrains a chain 421 common to both feed and withdrawal sections of the conveyor and this chain runs within the side walls 401. The chain 421 engages and is driven through a driving sprocket 425 by a reversible electric motor.

The plate 402 is provided with handles 430 which permit the plate and the conveyor 415 thereon to be bodily swung about its bearings 405, 406 away from the working station 403 (as shown in dotted lines in FIGURE 21) to permit of complete access to the strapping device whereby to ensure easy maintenance thereof.

Driven from the sprocket 425 through a coaxial gear 426 hereon is a gear wheel 432. On the shaft 432A is an electric clutch (not shown) in the mechanical drawing but the core thereof is illustrated in FIGURE 23, as 428 and connected and driven through that clutch is a sequencing cam disc 437. Arranged around the periphery of the disc in a predetermined order are a plurality of switch actuating cams one of which is shown in FIGURE 21 as 435 and a bank of two switches 606, 610 are arranged in side-by-side relationship adjacent the periphery of the disc so as to be operated by the cams thereon.

The configuration of the cams has not been described in detail since they are well known in the part and are of the push pin variety, that is to say, a cam housing is attached to the periphery of the disc 437 at a predetermined point and the cam housing carries a projecting pin which extends parallel to the axis of rotation of the disc sufficiently far to actuate one or more of the switches 606, 610 as the cam passes the switches.

Mounted on the periphery of the disc 437 in exactly the same manner as the other switch actuating cams is a "zero" cam which again projects parellel to the axis of rotation of the disc 437 but extends outwardly from the opposite side the disc to the other cams and is arranged to trip a "zero" limit switch 650.

Located within the side arms 401 adjacent the working station 403 is a downwardly depending sensor element 580 which is spring-biased to the underside of the conveyor and is depressed by the weight of a bale on the conveyor to cause it to actuate the limit switch 604.

Drive chain tensioning and supporting wheels of usual design are indicated at 439 and 438.

The operation of the conveyor with the strap applying device will now be described with reference to FIGURE 23.

The main power switch is on and the sequencing disc 437 is located with its cams in "zero" position, the sequence of applying one lengthwise and one crosswise strap on the same bale using a single wire strap applying device will be explained:

To initiate the automatic conveyor cycle, the conveyor "start" button 600 is pressed. Normally open contacts 600A of the conveyor start button 600 are momentarily closed by pressing the button and this energizes the control relay 601. Normally open contacts 601A of the control relay 601 close, sealing in the control relay 601. Normally open contacts 601B of the control relay 601 close, energizing the "forward" starting coil 602 of the conveyor 426, thus the conveyor is driven forward. Normally open contacts 600B of the conveyor "start" push button 600 are momentarily closed to energize control relay 603. Normally open contacts 603A of the control relay 603 close, sealing in the control relay 603. Normally open contacts 603B of the control relay 603 close, thus supplying power to switch on the automatic conveyor circuit illustrated in FIGURE 23. Movement of the bale on the conveyor causes the sensor element 580 to be depressed to momentarily actuate limit switch 604. Normally, open contacts 604A of the limit switch 604 close, energizing the control relay 605. Normally open contacts 605A of the control relay 605 close, engaging the D.C. clutch 428 to start the disc 437 revolving. When the bale reaches the position for the first strap to be applied one of the cams 435 in the disc contacts limit switches 606, 610 so that they are momentarily actuated. Normally open contacts 606A of the limit switch 606 close, energizing the control 607 to cause the strapping device to start the strapping cycle. At the same time normally closed contacts 606B of the limit switch 606 open, deenergizing the control relay 601, normally open contacts 601B of the control relay 601 open, deenergizing the "forward" coil 602 of the motor 426 thus stopping the conveyor; normally closed contacts 610A of the limit switch 610 open, deenergizing the control relay 605, normally open contacts 605B of the control relay 605 open, disengaging the D.C. clutch 428 to stop the disc revolving. Normally open contacts 610B of the limit switch 610 close, energizing the time delay relay 615. Normally open auxiliary contacts 615A of the time delay relay 615 close, sealing in the time delay relay 615 so that it is not "timing." Normally open contacts 615B of the time delay relay 615 close, energizing the control relay 616. Normally open contacts 616A of the control relay 616 close, preparing the control relay 618 for energization. Normally open contacts 616B of the control relay 616 close, energizing the time delay relay 620. Normally closed auxiliary contacts 620A of the time delay relay 620 and its normally closed contacts 620B open, preventing energization of the control relay 601. Normally open contacts 620C of the time delay relay 620 close, energizing the control relay 625. Normally open contacts 625A of the control relay 625 close sealing in the control relay 625. Normally open contacts 625B of the control relay 625 close, preparing control relay 601 for energization. The strapping machine finishes tying the strap and the twister head 85 retracts, actuating the limit switch. Normally open contacts 630A of the limit switch 630 close, energizing the control relay 618. Normally open contacts 618A of the control relay 618 close. Normally open contacts 618B of the control relay 618 close, energizing the "reverse" coil 635 of the conveyor motor 426 to drive the conveyor in reverse .Normally closed contacts 630B of the limit switch 630 open, deenergizing the time delay relay 615. The time delay relay time elapses and the normally open contacts 615B of the time delay relay 615 open, deenergizing the control relay 618 and the time delay relay 620. Normally open contacts 618B of the control relay 618 open, deenergizing the coil 635, thus stopping the conveyor. The bale is now clear of the end of the conveyor and it is manually turned through 90° about its vertical axis by the operator. Whilst this is being done time elapses for the time delay relay 620 and the normally closed contacts 620B of the time delay relay 620 close, energizing control relay 601. Normally open contacts 601A of the control relay 601 close, sealing in the control relay 601. Normally open contacts 601P of the control relay 601 close, energizing and sealing the coil 602; thus the conveyor drives forward with the reoriented bale thereon. Movement of the bale on the conveyor again causes the sensor element 580 to engage and actuate the limit switch 604 and the normally open contacts 604A of the limit switch 604 close, energizing the control relay 605. Normally open contacts 605A of the control relay 605 close, sealing in the control relay 605, normally open contacts 605B of the control relay 605 engaging the D.C. clutch to start the disc 437 revolving.

When the bale reaches a position for the second strap to be applied, as determined by the spacing of the second cam from the first cam 435 the second cam will trip the limit switch 606 which is momentarily actuated. Normally open contacts 606A of the limit switch 606 close, energizing the control relay 607 to initiate the strap applying cycle. Normally closed contacts 606B of the limit switch 606 open, deenergizing the control relay 601 and the control relay 625. Normally open contacts 601B of the control relay 601 open, deenergizing the "forward" coil 602 of the motor 426, thus stopping the conveyor.

The strap applying machine finished tying the strap and its twister head [85] *35* retracts, actuating the limit switch 630. Normally open contacts 630A of the limit switch 630 close, energizing the control relay 601. Normally open contacts 601A of the control relay 601 close, sealing in the control relay 601. Normally open contacts 601B of the control relay 601 close, energizing and sealing in the coil 602. Thus the conveyor drives forward. The limit switch 650 is momentarily actuated at "zero" position by a "zero" cam on the periphery of the sequencing disc, thus deenergizing the control relay 605. Normally open contacts 605B of the control relay 605 open, disengaging the D.C. clutch 428 on the disc 437.

It will be obvious that the sequence of operations described immediately above can be altered by the number and position of the cams on the periphery of the disc 437. In the instance where two straps are to be applied crosswise of the bale, it is merely necessary to repeat the initial sequence of strapping after the conveyor has restarted on termination of the first strap application in this arrangement however the initial cam will not engage switch 610 therefore the conveyor will not be reversed spacing of the second cam from the first cam being such that the conveyor will proceed to convey the bale the necessary distance through the strap applying head before stopping and commencing restrapping in order to permit of the correct spacing of the straps on the bale and the second cam will have an extended pin which actuates switch 610 exactly as described above for the first cam operation.

Clearly also it is possible to provide two discs which are interchangeable so that an operation merely by replacing one disc by another [can.] *cam* in the instance where two strapping machines are arranged in tandem and it is desired to operate one only, do the complete strapping on one machine or the complete strapping using the two machines.

In FIGURE 27 there is illustrated an individual link 412 of the conveyor chain and it will be observed that the link has down turned ends 412E which are inwardly tapered. This ensures that the strapping does not hook under the conveyor chain.

What I claim as my invention is:

1. A wire loop-forming element for use with automatic wire strapping machines comprising a substantially loop-shaped frame, wire guiding track means mounted within said frame and adapted to cooperate with an inside surface thereof to guide a wire fed thereto in a closed circuit to form a wire loop with an overlapping portion, means for moving said track means within said frame relatively thereto, and strap stripping means operated by movement of said track means away from said inside surface.

2. An automatic wire strapping machine for use with a wire dispensing reel comprising loop-forming means, means for feeding the wire from said dispensing reel to said loop-forming means by threading a free end of the wire from the dispensing means into guideways in said loop-forming means, stop means including a gripper element adapted to engage and grip said free end, switch means operated by movement of the stop means on engagement with said free end to cause a cessation of the threading of the wire, switch means operable to cause the stripping of the formed loop from the loop-forming means, switch means operable by movement of the loop-forming means to initiate means to apply tension to the wire to draw taut about a package, twister means and switch means operable to cause the twister means to engage the wire and knot it, and means to sever the wire from the wire dispensing reel and releases the loop from the gripper element.

3. An automatic device for applying a wire strap from a reel of wire to a bale or the like comprising in combination loop-forming guide means defining a working station at which the loop is formed and applied to the bale, means for feeding the wire to the loop-forming device, means for receiving and gripping the free end of the wire fed into the loop-forming device, which gripper means comprises a gripper head having upper and lower jaws adapted to receive and retain the free end of the wire when fed thereto and a plurality of lifting fingers adapted to engage the wire and transport the gripped wire vertically relative to the loop-forming means, means for releasing the formed loop from the loop-forming means, means for applying tension to the loop to draw it taut about the bale, twister means for engaging the loop so formed and knotting it, the twister means being arranged above the level at which the wire strap is fed into the loop-forming means, said gripper and lift fingers being adapted to raise the formed loop so that it may be engaged by the twister means, cutter means for severing unrequired wire from the loop, means for retracting the twister means from the tied loop and for releasing the free end from the gripper means, and electrical means sequencing the operation of the device automatically.

4. A device as claimed in claim 3, and conveyor means adapted to transport a package to the working position for the application of a strap, sequencing means being associated with said conveyor and said strap-applying device whereby to permit of the application of a predetermined number of straps in a predetermined order.

5. A device as claimed in claim 3, in which the gripper means comprises a fixed frame, gib means on said fixed frame, a lifting frame mounted in said gibs, a transverse shaft on said lifting frame, a tilting frame rockingly and slidably mounted on said transverse shaft, piston and cylinder means for closing said jaws, piston and cylinder means for raising said lifting frame with said transverse shaft and said tilting frame therewith, cam means associated with said tilting frame and said fixed frame and adapted to rock the tilting frame when the gripper jaws are opened and lowered and switch means operated by the opening of the gripper jaws to cause the automatic sequencing of both the said piston and cylinder means.

6. A conveying device for use with an automatic strapping machine comprising power means to drive the conveying device, a base, an upstanding frame thereon, [a work station on said frame,] a feed-in section for feeding a package to [the] *a* work station and a withdrawal section [on said frame] for removing the package away from said station, a sequencing disk mounted on the frame, sensing means associated with said feed-in section adapted to be actuated by the presence of a package on the conveying device approaching the work station to actuate said sequencing disc, cam means on said sequencing disc and a plurality of switch means controlling the power means and the automatic strapping machine operated by said cam means in predetermined order providing for the feeding of package to the work station, a pause at the work station to permit work to be done to the package and the withdrawal of the package on the withdrawal section after the completion of the work.

7. A conveyor for use with an automatic strapping machine comprising power means for driving the conveyor, a base, an upstanding frame thereon having a work station located substantially centrally thereof, a pair of bed plates hingedly connecting said upstanding frame and in conveying position, resting on top of said upstanding frame, a feed-in conveyor on one of the said plates to feed a bale to the work station, a feed-out conveyor on the other of the said plates to feed a bale away from the said work station, means to drive said conveyor, a sequencing disc mounted on the frame, a plurality of cams on said sequencing disc, a plurality of switch means adapted to be operated in predetermined sequence by said cams to control the operation of the conveyor and automatic strapping machine, means to drive said disc from the power means for driving said conveyor and handle means on said plates to permit of the pivoting of said plates on said upstanding frame away from said work station whereby to permit of easy access to said work station.

8. A conveyor as claimed in claim 7 wherein said feed-in conveyor and said feed-out conveyor comprises at least one endless chain conveyor belt, the links of which are substantially flat with downwardly turned tapered ends.

9. A tension head for use with an automatic strapping machine having a pair of feed rolls, which tension head comprises a pair of tensioning rolls, a driving shaft connected to one of the tensioning rolls, driving means including a slip clutch for rotating the driving shaft and tensioning roll connected thereto in tensioning direction; means for moving the tensioning rolls towards each other to an operative tensioning position; and sprag clutch means connected to said driving shaft to maintain the maximum tension applied to a strap through the slip clutch even after termination of drive therethrough.

*10. An automatic wire strapping machine comprising wire feeding means; wire tensioning means for tensioning a formed loop about a package; wire twisting means operable to form a sealing twist in the tensioned loop; wire cutting means operable to sever the sealed loop from said wire feeding means; and loop-forming means adapted to receive wire from said wire feeding means and form a loop therewith which comprises: loop-shaped wire guiding track means having a guide channel therein with rounded corners, cover means, said track means and said cover means being adapted to cooperate to guide a wire fed thereto through said guide channel to form a wire loop and being adapted to move relative to one another to release such a wire loop from said guide channel, and roller means provided in said track means at the rounded corners of said guide channel for rolling contact with wire passed through said channel.*

*11. A strapping machine according to claim 10 including a wire tensioning assembly comprising a pair of tensioning rolls, one of said rolls being mounted for rotation about a rotatable axis, a rotatable shaft, a bearing ring assembly mounting said one roll on said shaft eccentrically to the shaft axis of rotation such that rotation of said shaft adjusts the relative positions of said rolls; and means for rotating said shaft so as to adjust the relative positions of said rolls alternately toward one another for gripping a wire and away from one another for releasing a wire; and means for drivingly rotating said one roll when in a wire gripping position to tension such wire.*

*12. A strapping machine according to claim 10 including a wire feeding assembly comprising a pair of feeding rolls, one of said rolls being mounted for rotation about a rotatable axis, a rotatable shaft, a bearing ring assembly mounting said one roll on said shaft eccentrically to the shaft axis of rotation such that rotation of said shaft adjusts the relative positions of said rolls; and means for rotating said shaft so as to adjust the relative position of said rolls alternately toward one another for gripping a wire and away from one another for releasing a wire; and means for drivingly rotating said one roll when in a wire gripping position to feed such wire.*

*13. A strapping machine according to claim 10 including gripper means mounted adjacent said loop-forming means to receive the wire end after completion of said loop, said gripper having a movable jaw; means causing the jaw to close on the wire end, and means for controlling the jaw closing means.*

*14. A strapping machine according to claim 10 including stop means comprising a gripper element adapted to engage and grip the wire end after completion of said loop; switch means operated by movement of said stop means on engagement with said wire end to cause a cessation of the wire threading; switch means operable to cause the stripping of the formed loop from said loop forming means; and switch means operable to cause said wire twisting means to engage and knot the wire.*

*15. An automatic wire strapping system comprising an automatic wire strapping machine including wire feeding means, upright loop forming means adapted to receive wire from said wire feeding means to form a loop therewith, wire tensioning means for tensioning a formed loop about a package, wire twisting means operable to form a sealing twist in the tensioned loop, and wire cutting means operable to sever the sealed loop from said wire feeding means; conveyor means comprising a feed-in section for feeding a package to said loop forming means and a withdrawal section for removing a package from said loop forming means, at least one of said feed-in-section and said withdrawal section being adapted to be pivoted upward and outward away from said strapping machine to permit easy access to said strapping machine; and sequencing means associated with said conveyor means to permit the application of a predetermined number of straps in a predetermined order.*

*16. An automatic wire strapping system comprising an automatic wire strapping machine including wire feeding means, upright loop forming means adapted to receive wire from said wire feeding means to form a loop therewith, wire tensioning means for tensioning a formed loop about a package, wire twisting means operable to form a sealing twist in the tensioned loop, and wire cutting means operable to sever the sealed loop from said wire feeding means; conveyor means comprising a feed-in section for feeding a package to said loop forming means and a withdrawal section for removing a package from said loop forming means; and sequencing means associated with said conveyor means to permit the application of a predetermined number of straps in a predetermined order, said sequencing means comprising a sequencing disk, cam means on said sequencing disk, a plurality of switch means controlling said conveyor means and said wire strapping machine actuated by said cam means in predetermined order, and sensing means adapted to be actuated by a package on said conveyor means approaching said loop forming means to actuate said sequencing disk.*

*17. An automatic wire strapping system comprising an automatic wire strapping machine including wire feeding means, upright loop forming means adapted to receive wire from said wire feeding means to form a loop therewith, wire tensioning means for tensioning a formed loop about a package, wire twisting means operable to form a sealing twist in the tensioned loop, and wire cutting means*

*operable to sever the sealed loop from said wire feeding means; conveyor means comprising a feed-in section for feeding a package to said loop forming means and a withdrawal section for removing a package from said loop forming means; and sequencing means associated with said conveyor means to permit the application of a predetermined number of straps in a predetermined order; said loop forming means comprising loop-shaped wire guiding track means having a guide channel therein with rounded corners, cover means, said track means and said cover means being adapted to cooperate to guide a wire fed thereto through said guide channel to form a wire loop and being adapted to move relative to one another to release such a wire loop from said guide channel, and roller means provided in said track means at the rounded corners of said guide channel for rolling contact with wire passed through said guide channel.*

References Cited

The following references, cited by the Examiner, are of record in the patented file of this patent or the original patent.

UNITED STATES PATENTS

| | | | |
|---|---|---|---|
| 2,215,121 | 9/1940 | Harvey et al. | 100—26 X |
| 2,334,736 | 11/1943 | Willcox | 100—4 |
| 2,416,859 | 3/1947 | Vining et al. | 100—31 X |
| 2,619,027 | 11/1952 | Sykes. | |
| 2,684,626 | 7/1954 | Eberle | 100—14 X |
| 2,818,795 | 1/1958 | Gustafson | 100—4 |
| 3,019,577 | 2/1962 | Slamar et al. | |
| 3,095,678 | 7/1963 | Cliff et al. | |
| 1,805,791 | 5/1931 | Treat | 100—26 |
| 2,136,225 | 11/1938 | Williams | 100—29 X |
| 2,272,009 | 2/1942 | Kellar et al. | 100—222 X |
| 2,409,652 | 10/1946 | Workman | 100—26 |
| 2,662,468 | 12/1953 | Shenigo. | |
| 2,682,331 | 6/1954 | Campbell | 198—102 |
| 2,908,215 | 10/1959 | Fawcett | 100—26 |
| 2,908,216 | 10/1959 | Brouse et al. | 100—26 |
| 2,922,359 | 1/1960 | Brouse et al. | 100—26 |
| 2,959,118 | 11/1960 | Hager | 100—26 |
| 2,984,333 | 5/1961 | Long | 198—102 |
| 3,012,497 | 12/1961 | Fryer | 100—26 |
| 3,060,840 | 10/1962 | Vandebilt | 100—26 |
| 3,060,839 | 9/1962 | Vandebilt | 100—25 |
| 3,060,841 | 10/1962 | Vandebilt | 100—31 |
| 3,086,451 | 4/1963 | Vanderwal | 100—26 |

FOREIGN PATENTS

| | | |
|---|---|---|
| 212,408 | 1/1958 | Australia. |
| 98,328 | 6/1961 | Netherlands. |

BILLY J. WILHITE, *Primary Examiner.*